United States Patent
Rico Alvarino et al.

(10) Patent No.: US 11,317,251 B2
(45) Date of Patent: Apr. 26, 2022

(54) NUMEROLOGIES THAT SUPPORT BROADCASTING OVER A CARRIER

(71) Applicant: QUALCOMM Incorporated, San Diego, CA (US)

(72) Inventors: Alberto Rico Alvarino, San Diego, CA (US); Amer Catovic, Carlsbad, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 16/743,764

(22) Filed: Jan. 15, 2020

(65) Prior Publication Data

US 2020/0252756 A1    Aug. 6, 2020

Related U.S. Application Data

(60) Provisional application No. 62/801,491, filed on Feb. 5, 2019, provisional application No. 62/806,493, filed on Feb. 15, 2019.

(51) Int. Cl.
*H04W 4/06*     (2009.01)
*H04W 72/00*    (2009.01)
*H04L 12/18*    (2006.01)

(52) U.S. Cl.
CPC .......... *H04W 4/06* (2013.01); *H04W 72/005* (2013.01); *H04L 12/189* (2013.01)

(58) Field of Classification Search
CPC ....... H04W 72/005; H04W 4/06; H04W 8/26; H04L 12/189; H04L 12/185
USPC .......................................................... 370/312
See application file for complete search history.

(56) References Cited

U.S. PATENT DOCUMENTS

| | | | | |
|---|---|---|---|---|
| 8,520,582 B2* | 8/2013 | Gou | ................... | H04W 72/005 370/312 |
| 8,923,750 B2* | 12/2014 | Kim | ................... | H04W 72/1284 455/7 |
| 9,107,124 B2* | 8/2015 | Etemad | ............... | H04W 74/006 |
| 9,553,733 B2* | 1/2017 | Wu | ....................... | H04W 48/12 |
| 11,108,614 B2* | 8/2021 | Behravan | ............. | H04L 5/0092 |
| 2009/0103562 A1* | 4/2009 | Frederiksen | ......... | H04W 28/18 370/468 |
| 2010/0080159 A1* | 4/2010 | Hu | ..................... | H04W 72/005 370/312 |
| 2010/0254295 A1* | 10/2010 | Ahn | ................... | H04N 21/6131 370/312 |

(Continued)

*Primary Examiner* — Peter G Solinsky
*Assistant Examiner* — Sanjay K Dewan
(74) *Attorney, Agent, or Firm* — Holland & Hart LLP

(57) ABSTRACT

Methods, systems, and devices for wireless communications are described to improve support for broadcast systems. In some wireless communications systems, such as broadcast systems for a multimedia broadcast/multicast service (MBMS), an inter-site distance between transmitters or between a transmitter and a receiver may be relatively large compared to an inter-site distance for other scenarios of a wireless communication system (for example, cellular data or talk scenarios). A transmitter in a broadcast system may adjust one or more characteristics of resources in a frame, such as the subframe structure, slot structure, or symbol structure, in carriers dedicated for MBMS resource transmissions. For instance, the transmitter may adjust durations of one or more symbols in a frame.

30 Claims, 19 Drawing Sheets

(56) References Cited

U.S. PATENT DOCUMENTS

| | | | | |
|---|---|---|---|---|
| 2010/0284319 A1* | 11/2010 | Wang | .................... | H04W 40/00 |
| | | | | 370/312 |
| 2011/0080861 A1* | 4/2011 | Fischer | ............... | H04W 72/005 |
| | | | | 370/312 |
| 2011/0151911 A1* | 6/2011 | Yun | .................... | H04W 72/005 |
| | | | | 455/509 |
| 2011/0305183 A1* | 12/2011 | Hsu | .................. | H04W 36/0007 |
| | | | | 370/312 |
| 2012/0287880 A1* | 11/2012 | Frederiksen | .......... | H04L 1/0065 |
| | | | | 370/329 |
| 2013/0083715 A1* | 4/2013 | Etemad | ............. | H04W 72/1215 |
| | | | | 370/312 |
| 2013/0170421 A1* | 7/2013 | Wang | .................... | H04W 48/08 |
| | | | | 370/312 |
| 2013/0286924 A1* | 10/2013 | Gao | ...................... | H04W 24/02 |
| | | | | 370/312 |
| 2014/0105095 A1* | 4/2014 | Lee | .................. | H04W 36/0007 |
| | | | | 370/312 |
| 2014/0241232 A1* | 8/2014 | Damji | ................. | H04L 25/0226 |
| | | | | 370/312 |
| 2015/0071157 A1* | 3/2015 | Jung | .................... | H04W 36/08 |
| | | | | 370/312 |
| 2018/0070341 A1* | 3/2018 | Islam | .................... | H04L 1/1887 |
| 2018/0192255 A1* | 7/2018 | Guo | .................... | H04W 72/005 |
| 2018/0241524 A1* | 8/2018 | Andersson | .......... | H04W 72/042 |
| 2018/0368137 A1* | 12/2018 | Yin | ....................... | H04L 5/0055 |
| 2019/0208570 A1* | 7/2019 | Shrivastava | .......... | H04W 68/00 |
| 2019/0380087 A1* | 12/2019 | Park | ...................... | H04W 48/20 |
| 2020/0213978 A1* | 7/2020 | Iyer | ...................... | H04L 1/1812 |
| 2021/0120476 A1* | 4/2021 | Lee | ...................... | H04W 40/22 |

* cited by examiner

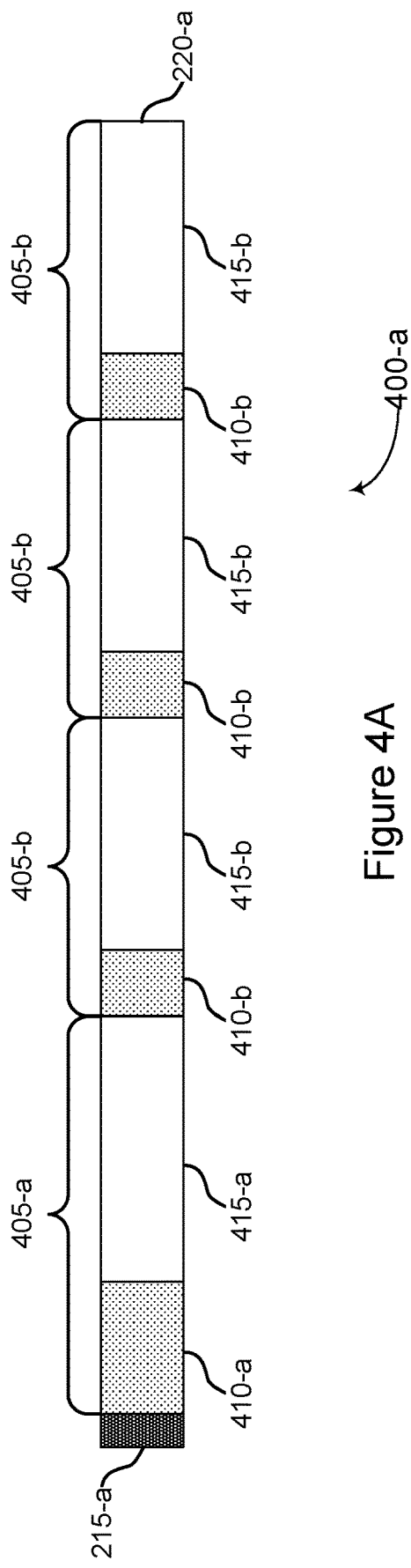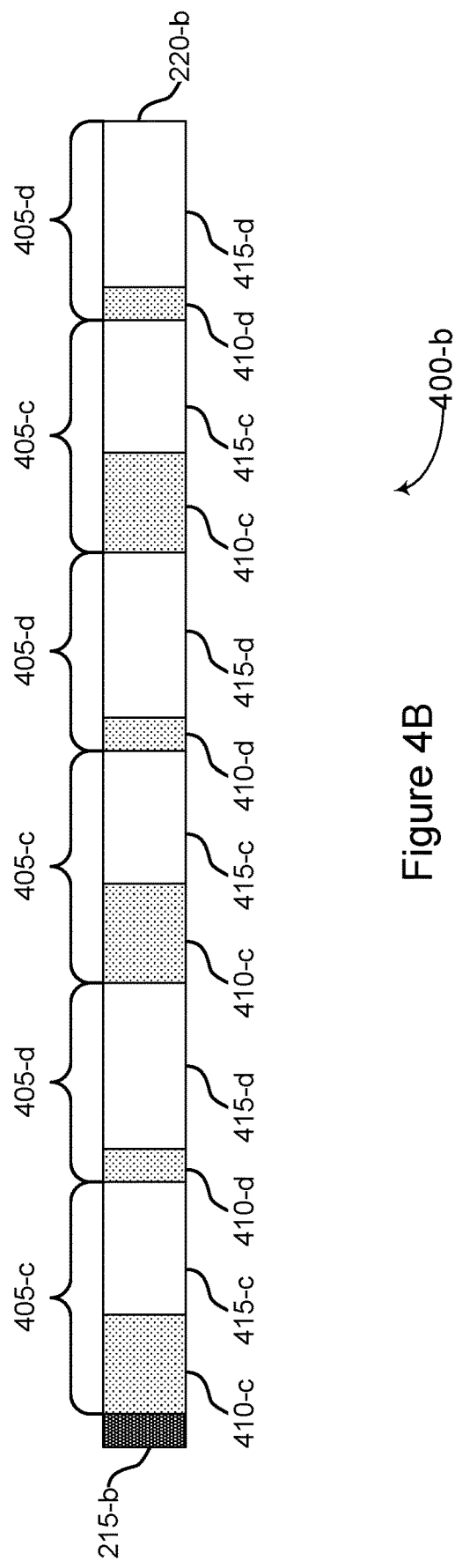
Figure 4A
Figure 4B

NUMEROLOGIES THAT SUPPORT BROADCASTING OVER A CARRIER

CROSS REFERENCE

The present application for patent claims the benefit of U.S. Provisional Patent Application No. 62/801,491 by RICO ALVARINO et al., entitled "NUMEROLOGIES THAT SUPPORT BROADCASTING OVER A CARRIER," filed Feb. 5, 2019, and to U.S. Provisional Patent Application No. 62/806,493 by RICO ALVARINO et al. entitled "NUMEROLOGIES THAT SUPPORT BROADCASTING OVER A CARRIER" filed Feb. 15, 2019, assigned to the assignee hereof, and expressly incorporated by reference in its entirety herein.

BACKGROUND

The following relates generally to wireless communications, and more specifically to numerologies that support broadcasting over a carrier.

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, such as broadcast systems for a multimedia broadcast/multicast service (MBMS), an inter-site distance between devices, such as between base stations or between a base station and a UE, may be relatively large compared to an inter-site distance for other implementations of a wireless communication system (for example, cellular data or talk scenarios). As the inter-site distance increases, a signal quality of signals transmitted (for example, from a base station) may be affected by an increased size of a channel delay spread.

SUMMARY

The described techniques relate to improved methods, systems, devices, and apparatuses for numerologies that support broadcasting over a carrier. Generally, the described techniques facilitate improvements for wireless communications systems, such as broadcast systems. A transmitter in the wireless communications system may adjust numerologies in one or more carriers dedicated for transmission, such as multimedia broadcast/multicast service (MBMS) resource transmissions, to receivers. For example, a transmitter may adjust one or more durations of one or more symbols to reduce the effects of channel delay spread.

A method of wireless communication is described. The method may include receiving system information that indicates at least one characteristic of resources in a frame of an MBMS carrier, determining, based on receiving the system information, that a control resource of the resources is associated with a first scheduling interval that spans a first duration in a time-domain and that a payload resource of the resources is associated with a second scheduling interval that spans a second duration in the time-domain greater than the first duration, and receiving, over the MBMS carrier, the control resource and the payload resource.

An apparatus for wireless communication is described. The apparatus may include a processor, memory in electronic communication with the processor, and instructions stored in the memory. The instructions may be executable by the processor to cause the apparatus to receive system information that indicates at least one characteristic of resources in a frame of an MBMS carrier, determine, based on receiving the system information, that a control resource of the resources is associated with a first scheduling interval that spans a first duration in a time-domain and that a payload resource of the resources is associated with a second scheduling interval that spans a second duration in the time-domain greater than the first duration, and receive, over the MBMS carrier, the control resource and the payload resource.

Another apparatus for wireless communication is described. The apparatus may include means for receiving system information that indicates at least one characteristic of resources in a frame of an MBMS carrier, determining, based on receiving the system information, that a control resource of the resources is associated with a first scheduling interval that spans a first duration in a time-domain and that a payload resource of the resources is associated with a second scheduling interval that spans a second duration in the time-domain greater than the first duration, and receiving, over the MBMS carrier, the control resource and the payload resource.

A non-transitory computer-readable medium storing code for wireless communication is described. The code may include instructions executable by a processor to receive system information that indicates at least one characteristic of resources in a frame of an MBMS carrier, determine, based on receiving the system information, that a control resource of the resources is associated with a first scheduling interval that spans a first duration in a time-domain and that a payload resource of the resources is associated with a second scheduling interval that spans a second duration in the time-domain greater than the first duration, and receive, over the MBMS carrier, the control resource and the payload resource.

In some examples of the method, apparatuses, and non-transitory computer-readable medium described herein, the first scheduling interval includes a control subframe and the second scheduling interval includes a payload slot, and the frame includes the control subframe and a plurality of payload slots. In some examples of the method, apparatuses, and non-transitory computer-readable medium described herein, the control subframe may include one or two slots of a third duration in the time-domain smaller than the second duration.

Some examples of the method, apparatuses, and non-transitory computer-readable medium described herein may further include operations, features, means, or instructions for determining that a first payload resource spans the second duration in the time-domain and a second payload resource spans a third duration in the time-domain different than the second duration and greater than the first duration. In some examples, receiving the control resource and the payload resource may be based on determining that the first payload resource spans the second duration and the second payload resource spans the third duration.

Some examples of the method, apparatuses, and non-transitory computer-readable medium described herein may further include operations, features, means, or instructions for determining a quantity of payload resources in the frame based on the system information. In some examples, determining that the second scheduling interval spans the second duration may be based on determining the quantity of payload resources in the frame.

Some examples of the method, apparatuses, and non-transitory computer-readable medium described herein may further include operations, features, means, or instructions for determining a first quantity of payload resources of a first type based on the system information. In some examples, the payload resources of the first type include the payload resource, and determining a second quantity of payload resources of a second type based on the system information. In some examples, determining that the second scheduling interval spans the second duration may be based on determining the first quantity and the second quantity.

In some examples of the method, apparatuses, and non-transitory computer-readable medium described herein, determining that the second scheduling interval spans the second duration further may include operations, features, means, or instructions for determining that each payload resource of a second set of payload resources spans a third duration in the time-domain different than the second duration.

In some examples of the method, apparatuses, and non-transitory computer-readable medium described herein, the second set of payload resources includes a single payload resource. In some examples of the method, apparatuses, and non-transitory computer-readable medium described herein, the first set of payload resources includes a set of payload resources and the second set of payload resources includes a set of payload resources.

Some examples of the method, apparatuses, and non-transitory computer-readable medium described herein may further include operations, features, means, or instructions for determining, based on the system information, that the second scheduling interval includes a single symbol that spans the second duration. In some examples, receiving the control resource and the payload resource may be based on determining that the second scheduling interval includes the single symbol.

Some examples of the method, apparatuses, and non-transitory computer-readable medium described herein may further include operations, features, means, or instructions for determining that a first portion of the single symbol spans a third duration in the time-domain and a second portion of the single symbol spans a fourth duration in the time-domain that may be greater than the third duration. In some examples, receiving the control resource and the payload resource may be based on determining the third duration and the fourth duration.

In some examples of the method, apparatuses, and non-transitory computer-readable medium described herein, the first portion of the single symbol includes a cyclic prefix of the single symbol, and the second portion of the single symbol includes a payload of the single symbol. In some examples of the method, apparatuses, and non-transitory computer-readable medium described herein, the third duration may be a first integer multiple of a sampling interval associated with the MBMS carrier, and the fourth duration may be a second integer multiple of the sampling interval greater than the first integer multiple. In some examples of the method, apparatuses, and non-transitory computer-readable medium described herein, the third duration may be greater than 200 microseconds, and the fourth duration may be greater than 800 microseconds.

Some examples of the method, apparatuses, and non-transitory computer-readable medium described herein may further include operations, features, means, or instructions for configuring a receiver based on determining that the first scheduling interval spans the first duration and the second scheduling interval spans the second duration. In some examples, receiving the control resource and the payload resource may be based on configuring the receiver.

Some examples of the method, apparatuses, and non-transitory computer-readable medium described herein may further include operations, features, means, or instructions for determining a first numerology associated with the control resource and a second numerology associated with the payload resource different than the first numerology. In some examples, receiving the control resource and the payload resource may be based on determining the first numerology and the second numerology.

In some examples of the method, apparatuses, and non-transitory computer-readable medium described herein, receiving the system information further may include operations, features, means, or instructions for receiving a SIB that includes the system information. In some examples of the method, apparatuses, and non-transitory computer-readable medium described herein, the system information includes SystemInformationBlockType1-MBMS. In some examples of the method, apparatuses, and non-transitory computer-readable medium described herein, the SystemInformationBlockType1-MBMS includes an information element that indicates the second duration of the second scheduling interval. In some examples of the method, apparatuses, and non-transitory computer-readable medium described herein, the MBMS carrier may be an MBMS-dedicated carrier.

In some examples of the method, apparatuses, and non-transitory computer-readable medium described herein, the second scheduling interval includes a Multicast-broadcast Single-frequency Network (MBSFN) subframe, and the first scheduling interval includes a non-MBSFN subframe. In some examples of the method, apparatuses, and non-transitory computer-readable medium described herein, the first scheduling interval includes a cell acquisition resource (CAS).

In some examples of the method, apparatuses, and non-transitory computer-readable medium described herein, the system information includes one or more of a numerology of the frame or a quantity of payload resources in the frame.

In some examples of the method, apparatuses, and non-transitory computer-readable medium described herein, a duration of the second scheduling interval may be configurable based on the system information. In some examples of the method, apparatuses, and non-transitory computer-readable medium described herein, the second duration of the second scheduling interval may be an integer multiple of a sampling interval associated with the MBMS carrier. In some examples of the method, apparatuses, and non-transitory computer-readable medium described herein, the second duration of the second scheduling interval may be associated with a subcarrier spacing of the MBMS carrier.

In some examples of the method, apparatuses, and non-transitory computer-readable medium described herein, the first duration associated with the first scheduling interval may be one millisecond, and the second duration associated with the second scheduling interval may be greater than one millisecond. In some examples of the method, apparatuses, and non-transitory computer-readable medium described herein, the second duration associated with the second scheduling interval may be three milliseconds and the frame may include thirteen payload resources. In some examples of the method, apparatuses, and non-transitory computer-readable medium described herein, a duration of the frame in the time-domain may be forty milliseconds.

A method of wireless communication is described. The method may include transmitting, in a frame of a MBMS carrier, system information indicating that a control resource spans a first duration in a time-domain and that a payload resource, in the frame of the MBMS carrier, spans a second duration in the time-domain greater than the first duration and transmitting, over the MBMS carrier, the control resource and the payload resource based on transmitting the system information.

An apparatus for wireless communication is described. The apparatus may include a processor, memory in electronic communication with the processor, and instructions stored in the memory. The instructions may be executable by the processor to cause the apparatus to transmit, in a frame of a MBMS carrier, system information indicating that a control resource spans a first duration in a time-domain and that a payload resource, in the frame of the MBMS carrier, spans a second duration in the time-domain greater than the first duration and transmit, over the MBMS carrier, the control resource and the payload resource based on transmitting the system information.

Another apparatus for wireless communication is described. The apparatus may include means for transmitting, in a frame of a MBMS carrier, system information indicating that a control resource spans a first duration in a time-domain and that a payload resource, in the frame of the MBMS carrier, spans a second duration in the time-domain greater than the first duration and transmitting, over the MBMS carrier, the control resource and the payload resource based on transmitting the system information.

A non-transitory computer-readable medium storing code for wireless communication is described. The code may include instructions executable by a processor to transmit, in a frame of a MBMS carrier, system information indicating that a control resource spans a first duration in a time-domain and that a payload resource, in the frame of the MBMS carrier, spans a second duration in the time-domain greater than the first duration and transmit, over the MBMS carrier, the control resource and the payload resource based on transmitting the system information.

Some examples of the method, apparatuses, and non-transitory computer-readable medium described herein may further include operations, features, means, or instructions for identifying that the first scheduling interval spans the first duration in the time-domain and that the second scheduling interval spans the second duration in the time-domain longer than the first duration. In some examples, transmitting the system information may be based on identifying the first duration and the second duration.

Some examples of the method, apparatuses, and non-transitory computer-readable medium described herein may further include operations, features, means, or instructions for determining an inter-site distance associated with a transmitter of the MBMS carrier. In some examples, determining the first duration and the second duration may be based on the inter-site distance associated with the transmitter.

Some examples of the method, apparatuses, and non-transitory computer-readable medium described herein may further include operations, features, means, or instructions for determining that a first payload resource spans the second duration in the time-domain and a second payload resource spans a third duration in the time-domain different than the second duration and greater than the first duration. In some examples, transmitting the system information may be based on determining that the first payload resource spans the second duration and the second payload resource spans the third duration.

Some examples of the method, apparatuses, and non-transitory computer-readable medium described herein may further include operations, features, means, or instructions for determining a quantity of payload resources in the frame. In some examples, transmitting the system information may be based on determining the quantity of payload resources in the frame.

Some examples of the method, apparatuses, and non-transitory computer-readable medium described herein may further include operations, features, means, or instructions for determining a first quantity of payload resources of a first type based on the system information. In some examples, the payload resources of the first type include the payload resource, and determining a second quantity of payload resources of a second type based on the system information. In some examples, transmitting the system information may be based on determining the first quantity and the second quantity.

Some examples of the method, apparatuses, and non-transitory computer-readable medium described herein may further include operations, features, means, or instructions for determining that each payload resource of a first set of payload resources spans the second duration, and determining that each payload resource of a second set of payload resources spans a third duration in the time-domain different than the second duration. In some examples, transmitting the system information may be based on the determining the second duration and the third duration.

In some examples of the method, apparatuses, and non-transitory computer-readable medium described herein, the second set of payload resources includes a single payload resource. In some examples of the method, apparatuses, and non-transitory computer-readable medium described herein, the first set of payload resources includes a set of payload resources and the second set of payload resources includes a set of payload resources.

Some examples of the method, apparatuses, and non-transitory computer-readable medium described herein may further include operations, features, means, or instructions for determining that the second scheduling interval includes a single symbol that spans the second duration. In some examples, transmitting the system information may be based on determining that the second scheduling interval includes the single symbol.

Some examples of the method, apparatuses, and non-transitory computer-readable medium described herein may further include operations, features, means, or instructions for determining that a first portion of the single symbol spans a third duration in the time-domain and a second portion of the single symbol spans a fourth duration in the time-domain that may be greater than the third duration. In some examples, transmitting the system information may be based on determining the third duration and the fourth duration.

In some examples of the method, apparatuses, and non-transitory computer-readable medium described herein, the first portion of the single symbol includes a cyclic prefix of the single symbol, and the second portion of the single symbol includes a payload of the single symbol. In some examples of the method, apparatuses, and non-transitory computer-readable medium described herein, the third duration may be a first integer multiple of a sampling interval associated with the MBMS carrier, and the fourth duration may be a second integer multiple of the sampling interval greater than the first integer multiple. In some examples of the method, apparatuses, and non-transitory computer-readable medium described herein, the third duration may be greater than 200 microseconds, and the fourth duration may be greater than 800 microseconds.

Some examples of the method, apparatuses, and non-transitory computer-readable medium described herein may further include operations, features, means, or instructions for configuring a transmitter based on determining that the first scheduling interval spans the first duration and the second scheduling interval spans the second duration. In some examples, transmitting the system information may be based on configuring the transmitter.

Some examples of the method, apparatuses, and non-transitory computer-readable medium described herein may further include operations, features, means, or instructions for determining a first numerology associated with the control resource and a second numerology associated with the payload resource different than the first numerology. In some examples, transmitting the system information may be based on determining the first numerology and the second numerology.

In some examples of the method, apparatuses, and non-transitory computer-readable medium described herein, transmitting the system information further may include operations, features, means, or instructions for transmitting a SIB that includes the system information. In some examples of the method, apparatuses, and non-transitory computer-readable medium described herein, the system information includes SystemInformationBlockType1-MBMS. In some examples of the method, apparatuses, and non-transitory computer-readable medium described herein, the SystemInformationBlockType1-MBMS includes an information element that indicates the second duration of the second scheduling interval. In some examples of the method, apparatuses, and non-transitory computer-readable medium described herein, the MBMS carrier may be an MBMS-dedicated carrier.

In some examples of the method, apparatuses, and non-transitory computer-readable medium described herein, the second scheduling interval includes a MBSFN subframe, and the first scheduling interval includes a non-MBSFN subframe. In some examples of the method, apparatuses, and non-transitory computer-readable medium described herein, the first scheduling interval includes a CAS. In some examples of the method, apparatuses, and non-transitory computer-readable medium described herein, the system information includes one or more of a numerology of the frame or a quantity of payload resources in the frame.

In some examples of the method, apparatuses, and non-transitory computer-readable medium described herein, a duration of the second scheduling interval may be configurable based on the system information.

In some examples of the method, apparatuses, and non-transitory computer-readable medium described herein, the second duration of the second scheduling interval may be an integer multiple of a sampling interval associated with the MBMS carrier.

In some examples of the method, apparatuses, and non-transitory computer-readable medium described herein, the first duration associated with the first scheduling interval may be one millisecond, and the second duration associated with the second scheduling interval may be greater than one millisecond. In some examples of the method, apparatuses, and non-transitory computer-readable medium described herein, a duration of the frame in the time-domain may be forty milliseconds.

BRIEF DESCRIPTION OF THE DRAWINGS

FIGS. 4A and 4B illustrate examples of transmission frames for numerologies that support broadcasting over a carrier in accordance with aspects of the present disclosure.

DETAILED DESCRIPTION

In some wireless communications systems, such as broadcast systems for a multimedia broadcast/multicast service (MBMS), an inter-site distance between transmitters or between a transmitter and a receiver may be relatively large compared to an inter-site distance for other implementations of a wireless communication system (for example, cellular data or talk scenarios). As the inter-site distance increases, a signal quality of signals transmitted from a first device, such as a base station, may be affected by an increased size of a channel delay spread, among other issues, which may lead to increased inter-symbol interference. It may be desirable to improve broadcast transmissions in these systems.

Techniques are described to improve support for broadcast systems. A transmitter in a broadcast system may adjust characteristics of resources (for example, subframes, slots, or symbols) in carriers dedicated for transmissions, such as MBMS resource transmissions, to receivers in the broadcast system. For example, the transmitter may adjust durations of one or more symbols to reduce the effects of channel delay spread, among other issues. The techniques may include signaling techniques and numerologies that may be used to indicate different durations for symbols in a frame of a carrier, such as an MBMS carrier.

Aspects of the disclosure are initially described in the context of a wireless communications system. Aspects of the disclosure are further described in the context of another wireless communications system, a process flow, and a number of transmission frames that relate to numerologies that support broadcasting over a carrier. Aspects of the disclosure are further illustrated by and described with reference to apparatus diagrams, system diagrams, and flowcharts that relate to numerologies that support broadcasting over a carrier.

Figure 1:
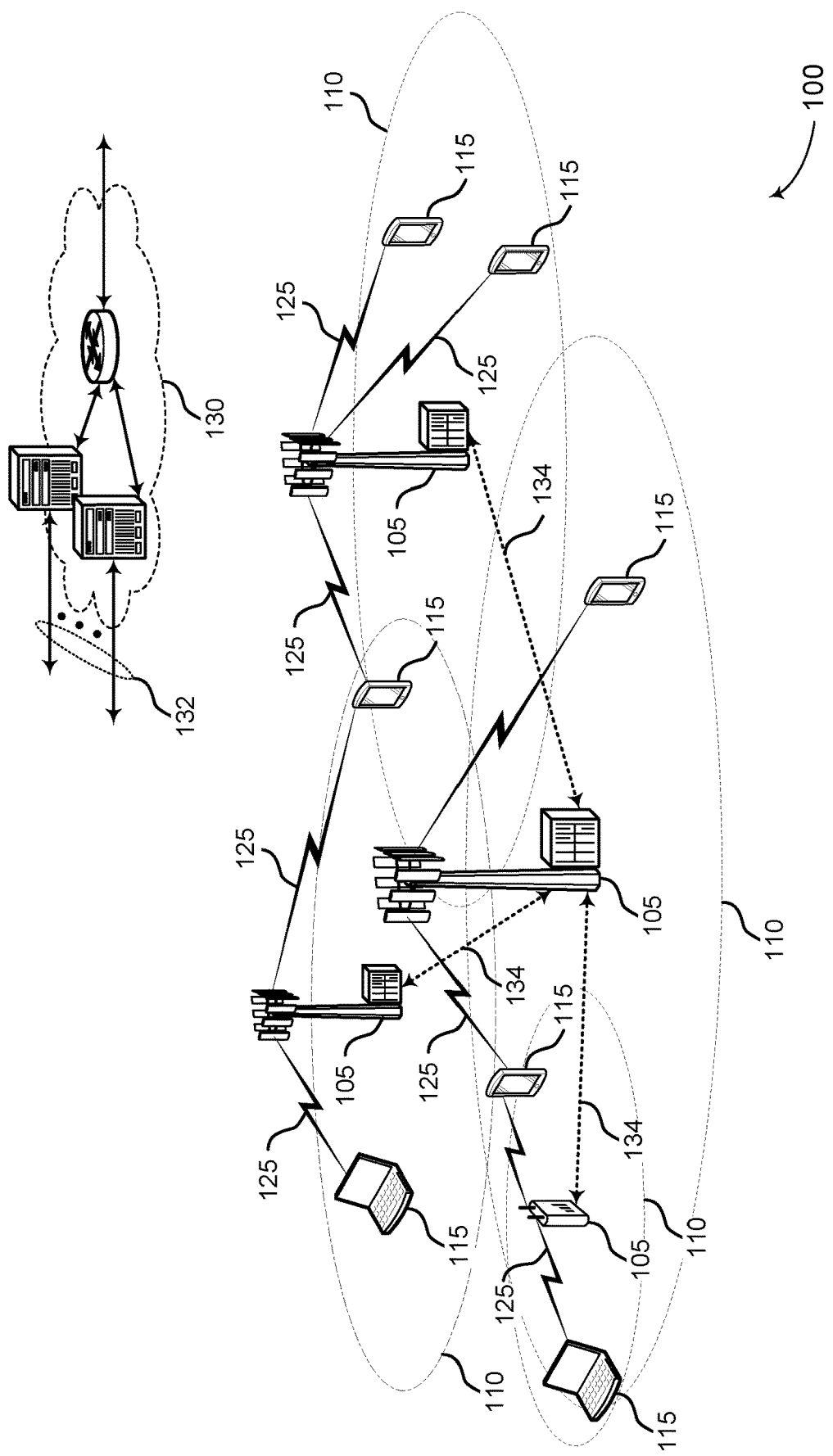
FIG. 1 illustrates an example of a wireless communication system for numerologies that support broadcasting over a carrier in accordance with aspects of the present disclosure.

FIG. 1 illustrates an example of a wireless communications system 100 for numerologies that support broadcasting over a carrier in accordance with aspects of the present disclosure. The wireless communications system 100 includes transmitters 105, receivers 115, and a core network 130. In some examples, the transmitters 105 may be examples of base stations and the receivers 115 may be examples of UEs. In some examples, the wireless communications system 100 may be a Long Term Evolution (LTE) network, an LTE-Advanced (LTE-A) network, an LTE-A Pro network, or a New Radio (NR) network. In some examples, wireless communications system 100 may support enhanced broadband communications, ultra-reliable (for example, mission critical) communications, low latency communications, or communications with low-cost and low-complexity devices.

Transmitters 105 may wirelessly communicate with receivers 115 via one or more antennas. Transmitters 105 may be configured to both transmit and receive communications (such as, uplink and downlink communications) with the receivers 115. Similarly, the receivers 115 may be configured to both transmit and receive communications (such as, uplink and downlink communications) with the transmitters 105. In some implementations, the transmitters 105 may not be configured to receive information over specific carriers (for example, MBMS-dedicated carriers) and the receivers 115 may not be configured to transmit information over the specific carriers (for example, MBMS-dedicated carriers). Transmitters 105 described herein may include or may be referred to by those skilled in the art as a base station, a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include transmitters 105 of different types (for example, macro or small cell base stations). The receivers 115 described herein may be able to communicate with various types of transmitters 105 and network equipment including macro eNBs, small cell eNBs, gNBs, and relay base stations, among other examples.

Each transmitter 105 may be associated with a particular geographic coverage area 110 in which communications with various receivers 115 is supported. Each transmitter 105 may provide communication coverage for a respective geographic coverage area 110 via communication links 125, and communication links 125 between a transmitter 105 and a receiver 115 may utilize one or more carriers. Communication links 125 shown in wireless communications system 100 may include uplink transmissions from a receiver 115 to a transmitter 105, or downlink transmissions from a transmitter 105 to a receiver 115. Downlink transmissions may also be called forward link transmissions while uplink transmissions may also be called reverse link transmissions.

The geographic coverage area 110 for a transmitter 105 may be divided into sectors making up a portion of the geographic coverage area 110, and each sector may be associated with a cell. For example, each transmitter 105 may provide communication coverage for a macro cell, a small cell, a hot spot, or other types of cells, or various combinations thereof. In some examples, a transmitter 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same transmitter 105 or by different transmitters 105. The wireless communications system 100 may include, for example, a heterogeneous LTE/LTE-A/LTE-A Pro or NR network in which different types of transmitters 105 provide coverage for various geographic coverage areas 110.

The term "cell" refers to a logical communication entity used for communication with a transmitter 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (for example, a sector) over which the logical entity operates.

Receivers 115 may be dispersed throughout the wireless communications system 100, and each receiver 115 may be stationary or mobile. A receiver 115 may also be referred to as a mobile device, a wireless device, a remote device, a handheld device, or a subscriber device, or some other suitable terminology. In some examples, the "device" may also be referred to as a unit, a station, a terminal, or a client. A receiver 115 may also be a personal electronic device such as a cellular phone, a personal digital assistant (PDA), a tablet computer, a laptop computer, a personal computer, a read-only mode device, or a television receiver with MBMS capabilities. In some examples, a receiver 115 may also refer to a wireless local loop (WLL) station, an Internet of Things (IoT) device, an Internet of Everything (IoE) device, or an MTC device, among other examples, which may be implemented in various articles such as appliances, vehicles, or meters, among other examples.

Some receivers 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a transmitter 105 without human intervention. In some examples, M2M communication or MTC may include communications from devices that integrate sensors or meters to measure or capture information and relay that information to a central server or application program that can make use of the information or present the information to humans interacting with the program or application. Some receivers 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some receivers 115 may be configured to employ operating modes that reduce power consumption, such as half-duplex communications (for example, a mode that supports one-way communication via transmission or reception, but not transmission and reception simultaneously or a receive-only mode configured to receive broadcast transmissions). In some examples half-duplex communications may be performed at a reduced peak rate. Other power conservation techniques for receivers 115 include entering a power saving "deep sleep" mode when not engaging in active communications, or operating over a limited bandwidth (for example, according to narrowband communications). In some examples, receivers 115 may be designed to support critical functions (for example, mission critical functions), and a wireless communications system 100 may be configured to provide ultra-reliable communications for these functions.

In some examples, a receiver 115 may also be able to communicate directly with other receivers 115 (for example, using a peer-to-peer (P2P) or device-to-device (D2D) protocol). One or more of a group of receivers 115 utilizing D2D communications may be within the geographic coverage area 110 of a transmitter 105. Other receivers 115 in such a group may be outside the geographic coverage area 110 of a transmitter 105, or be otherwise unable to receive transmissions from a transmitter 105. In some examples, groups of receivers 115 communicating via D2D communications may utilize a one-to-many (1:M) system in which each receiver 115 transmits to every other receiver 115 in the group. In some examples, a transmitter 105 facilitates the scheduling of resources for D2D communications. In other cases, D2D communications are carried out between receivers 115 without the involvement of a transmitter 105.

Transmitters 105 may communicate with the core network 130 and with one another. For example, transmitters 105 may interface with the core network 130 through backhaul links 132 (for example, via an S1, $N_2$, N3, or other interface). Transmitters 105 may communicate with one another over backhaul links 134 (for example, via an X2, Xn, or other interface) either directly (for example, directly between transmitters 105) or indirectly (for example, via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (for example, control plane) functions such as mobility, authentication, and bearer management for receivers 115 served by transmitters 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

In some implementations, the core network 130 may include a broadcast-multicast service center (BM-SC) configured to provide functions for MBMS user service provisioning and delivery. The BM-SC may serve as an entry point for content provider transmissions, such as MBMS transmissions, that may be used to authorize and initiate MBMS Bearer Services within the public land mobile network (PLMN) and may be used to schedule and deliver MBMS transmissions. In some implementations, the core network 130 may include a gateway, such as an MBMS gateway (MBMS GW), that may be configured to provide an interface for entities using MBMS bearers through a user plane reference point and to provide an interface for entities using MBMS bearers through the control plane reference point. In some implementations, the MBMS GW may be configured to provide IP multicast distribution of MBMS user plane data to E-UTRAN (for example, an M1 reference point). If the MBMS GW has allocated both an IPv4 and an IPv6 IP Multicast address, IP multicast distribution of MBMS user plane data may be performed towards both IP Multicast addresses, for example, using the same Common Tunnel Endpoint ID (C-TEID). In some implementations, the MBMS GW may be configured to provide IP multicast distribution of MBMS user plane data to RNCs (M1 reference point).

At least some of the network devices, such as a transmitter 105, may include subcomponents such as an access network entity, which may be an example of an access node controller (ANC). Each access network entity may communicate with receivers 115 through a number of other access network transmission entities, which may be referred to as a radio head, a smart radio head, or a transmission/reception point (TRP). In some configurations, various functions of each access network entity or transmitter 105 may be distributed across various network devices (for example, radio heads and access network controllers) or consolidated into a single network device (for example, a transmitter 105).

In some implementations, the core network 130 may include components or elements associated with an Evolved Multimedia Broadcast Multicast Service (eMBMS). In some eMBMS networks, broadcast services (such as audio streaming, video streaming) may be provided as broadcast services (such as Multimedia Broadcast Multicast Service (MBMS) services) to computing devices. MBMS signals may be broadcast on the broadcast channel from base stations (such as eNBs or gNBs) in a network.

In eMBMS networks, a computing device may listen to the broadcast channel without registering with the network. The ability to listen to the broadcast channel without registering with the network may enable receive-only mode computing devices (such as, receiver 115) to receive broadcast services in a network. Both receivers 115 that are configured as receive-only mode computing devices and receivers 115 that are configured as receiver and transmit mode computing devices may be configured to receive MBMS broadcast transmissions over an MBMS carrier. A receive-only mode computing device may operate independently of a subscription to a network. Receive-only mode computing devices may have no unicast capability and may not perform signaling with the network (for example, no registration, no authentication, no authorization). In some implementations, the receiver 115 may be an example of a receive-only mode computing device that does not include the ability to transmit information using the wireless communications system 100. An example of a receiver 115 that is a receive-only mode computing device may be a television receiver.

Broadcast services associated with MBMS carriers may include different types of services (or service types). Examples of such broadcast services may include one or more of broadcast television (TV) services, vehicle to everything (V2X) services, or Internet of Things (IoT) supporting services.

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to receivers 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between receivers 115 and transmitters 105, and EHF antennas of the respective devices may be even smaller and more closely spaced than UHF antennas. In some examples, this may facilitate use of antenna arrays within a receiver 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as transmitters 105 and receivers 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (for example, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, transmitter 105 or receiver 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (for example, a transmitter 105) and a receiving device (for example, a receiver 115). In some examples, the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (for example, the same codeword) or different data streams. Different spatial layers may be associated with different antenna ports used for channel measurement and reporting. MIMO techniques include single-user MIMO (SU-MIMO), such that multiple spatial layers are transmitted to the same receiving device, and multiple-user MIMO (MU-MIMO), such that multiple spatial layers are transmitted to multiple devices.

Beamforming, which may also be referred to as spatial filtering, directional transmission, or directional reception, is a signal processing technique that may be used at a transmitting device or a receiving device (for example, a transmitter 105 or a receiver 115) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In some examples, a transmitter 105 may use multiple antennas or antenna arrays to conduct beamforming operations for directional communications with a receiver 115. For instance, some signals (for example synchronization signals, reference signals, beam selection signals, or other control signals) may be transmitted by a transmitter 105 multiple times in different directions, which may include a signal being transmitted according to different beamforming weight sets associated with different directions of transmission. Transmissions in different beam directions may be used to identify (for example, by the transmitter 105 or a receiving device, such as a receiver 115) a beam direction for subsequent transmission or reception by the transmitter 105.

Some signals, such as data signals associated with a particular receiving device, may be transmitted by a transmitter 105 in a single beam direction (for example, a direction associated with the receiving device, such as a receiver 115). In some examples, the beam direction associated with transmissions along a single beam direction may be determined based at least in part on a signal that was transmitted in different beam directions. For example, a receiver 115 may receive one or more of the signals transmitted by the transmitter 105 in different directions, and the receiver 115 may report to the transmitter 105 an indication of the signal it received with a highest signal quality, or an otherwise acceptable signal quality. Although these techniques are described with reference to signals transmitted in one or more directions by a transmitter 105, a receiver 115 may employ similar techniques for transmitting signals multiple times in different directions (for example, for identifying a beam direction for subsequent transmission or reception by the receiver 115), or transmitting a signal in a single direction (for example, for transmitting data to a receiving device).

A receiving device (for example, a receiver 115, which may be an example of a mmW receiving device) may try multiple receive beams when receiving various signals from the transmitter 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (for example, when receiving a data signal). The single receive beam may be aligned in a beam direction determined based at least in part on listening according to different receive beam directions (for example, a beam direction determined to have a highest signal strength, highest signal-to-noise ratio, or otherwise acceptable signal quality based at least in part on listening according to multiple beam directions).

In some examples, the antennas of a transmitter 105 or receiver 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a transmitter 105 may be located in diverse geographic locations. A transmitter 105 may have an antenna array with a number of rows and columns of antenna ports that the transmitter 105 may use to support beamforming of communications with a receiver 115. Likewise, a receiver 115 may have one or more antenna arrays that may support various MIMO or beamforming operations.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a receiver 115 and a transmitter 105 or core network 130 supporting radio bearers for user plane data. At the Physical layer, transport channels may be mapped to physical channels.

In some examples, receivers 115 and transmitters 105 may support retransmissions of data to increase the likelihood that data is received successfully. HARQ feedback is one technique of increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, signal-to-noise conditions). In some examples, a wireless device may support same-slot HARQ feedback, and the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration (for example, a scheduling duration) of 10 milliseconds (ms). In some examples, the frame duration may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol durations (for example, depending on the length of the cyclic prefix prepended to each symbol duration). Excluding the cyclic prefix, each symbol duration may contain 2048 sampling periods. In some examples, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (for example, in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a receiver 115 and a transmitter 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (for example, an evolved universal mobile telecommunication system terrestrial radio access (E-UTRA) absolute radio frequency channel number (EARFCN)), and may be positioned according to a channel raster for discovery by receivers 115. Carriers may be downlink or uplink (for example, in an FDD mode), or be configured to carry downlink and uplink communications (for example, in a TDD mode). In some examples, signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (for example, LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (for example, synchronization signals or system information, among other examples) and control signaling that coordinates operation for the carrier. In some examples (for example, in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (for example, between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (for example, 1.4, 3, 5, 10, 15, 20, 40, or 80 MHz). In some examples, each served receiver 115 may be configured for operating over portions or all of the carrier bandwidth. In other examples, some receivers 115 may be configured for operation using a narrowband protocol type that is associated with a predefined portion or range (for example, set of subcarriers or RBs) within a carrier (for example, "in-band" deployment of a narrowband protocol type).

In a system employing MCM techniques, a resource element may consist of one symbol period (for example, a duration of one modulation symbol) and one subcarrier. In some examples, the symbol period and subcarrier spacing may be inversely related. The number of bits carried by each resource element may depend on the modulation scheme (for example, the order of the modulation scheme). Thus, the more resource elements that a receiver 115 receives and the higher the order of the modulation scheme, the higher the data rate may be for the receiver 115. In MIMO systems, a wireless communications resource may refer to a combination of a radio frequency spectrum resource, a time resource, and a spatial resource (for example, spatial layers), and the use of multiple spatial layers may further increase the data rate for communications with a receiver 115.

Devices of the wireless communications system 100 (for example, transmitters 105 or receivers 115) may have a hardware configuration that supports communications over a particular carrier bandwidth, or may be configurable to support communications over one of a set of carrier bandwidths. In some examples, the wireless communications system 100 may include one or more of transmitters 105 or receivers 115 that support simultaneous communications via carriers associated with more than one different carrier bandwidth.

Wireless communications system 100 may support communication with a receiver 115 on multiple cells or carriers, a feature which may be referred to as carrier aggregation or multi-carrier operation. A receiver 115 may be configured with multiple downlink component carriers and one or more uplink component carriers according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (for example, when multiple serving cells have a suboptimal or non-ideal backhaul link). An eCC may also be configured for use in unlicensed spectrum or shared spectrum (for example, more than one operator is allowed to use the spectrum). An eCC characterized by wide carrier bandwidth may include one or more segments that may be utilized by receivers 115 that are not capable of monitoring the whole carrier bandwidth or are otherwise configured to use a limited carrier bandwidth (for example, to conserve power).

In some examples, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a receiver 115 or transmitter 105, utilizing eCCs may transmit wideband signals (for example, according to frequency channel or carrier bandwidths of 20, 40, 60, or 80 MHz, among other examples) at reduced symbol durations (for example, 16.67 microseconds). A TTI in eCC may consist of one or multiple symbol periods. In some examples, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (for example, across the frequency domain) and horizontal (for example, across the time domain) sharing of resources.

In some wireless communications systems, transmitters 105 may be transmitters in a broadcast system for an MBMS, and receivers 115 may be receivers in a broadcast network. In broadcast systems, an inter-site distance between transmitters 105 or between a transmitter 105 and a receiver 115 may be relatively large (for example, ten (10) kilometers (km), fifty (50) km, one hundred (100) km, or more than 100 km, among other examples) compared to an inter-site distance for other scenarios of the wireless communications system 100 (for example, cellular data or talk scenarios). As the inter-site distance increases, a signal quality of signals transmitted from a transmitter 105 may be affected by an increased size of a channel delay spread, which may lead to an increased inter-symbol interference.

Techniques are described to improve support for broadcast systems. A transmitter 105 may adjust numerologies in carriers dedicated for MBMS resource transmissions to receivers 115. For example, the transmitter 105 may adjust durations of one or more symbols to reduce the effects of channel delay spread.

Figure 2:
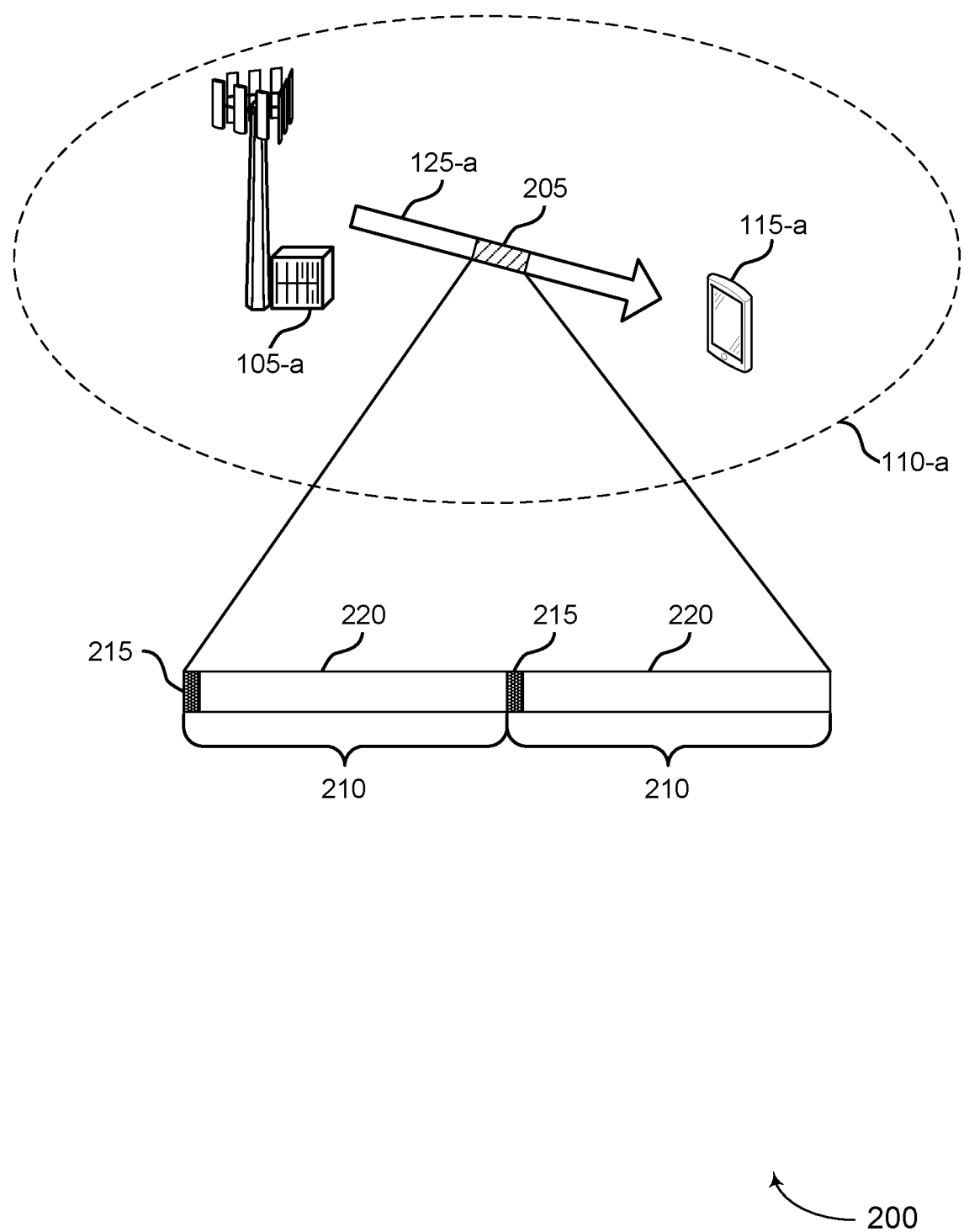
FIG. 2 illustrates an example of a wireless communication system for numerologies that support broadcasting over a carrier in accordance with aspects of the present disclosure.

FIG. 2 illustrates an example of a wireless communication system 200 for numerologies that support broadcasting over a carrier in accordance with aspects of the present disclosure. In some implementations, wireless communication system 200 may implement aspects of wireless communications system 100. The wireless communication system 200 may be used for broadcast services, in some examples. When the wireless communication system 200 is used for broadcast services (for example, MBMS), downlink resources may be transmitted from a transmitter 105-a to a receiver 115-a via a communication link 125-a. In some examples, downlink resources may be associated with a scheduling interval (for example, based on when a downlink resource is transmitted or received). In some implementations, the transmitters 105 may be examples of base stations and the receivers 115 may be examples of UEs. Transmitters 105 may be configured to both transmit and receive communications (such as, uplink and downlink communications) with the receivers 115. Similarly, the receivers 115 may be configured to both transmit and receive communications (such as uplink and downlink communications) with the transmitters 105. In some implementations, the transmitters 105 may not be configured to receive information over specific carriers (such as MBMS-dedicated carriers) and the receivers 115 may not be configured to transmit information over the specific carriers (such as MBMS-dedicated carriers).

The downlink resources may include time resources and frequency resources. The time resources and the frequency resources may be assigned based on a time-frequency resource grid. The frequency resources may include one or more physical resource blocks, and each of the one or more physical resource blocks may include a number frequency subcarriers (for example, 1, 2, 3, 4, 5, 6, 7, 8, 9, 10, 11, or 12 frequency subcarriers). The time resources may include one or more slots, and each of the one or more slots may include a number of symbols (for example, 1, 2, 3, 4, 5, 6, 7, or 8 symbols). The one or more slots may be grouped into one or more subframes, and the one or more subframes may be grouped into one or more frames (for example, one or more radio frames). Each symbol of the one or more symbols may include a cyclic prefix (CP) portion and a data portion (for example, a payload portion).

The configuration of time resources and the frequency resources used to communicate information may be based on a numerology of the carrier. The numerology may define one or more of a subcarrier spacing, a duration of the CP portion, a duration of the data portion, a fast Fourier transform (FFT) size, a number of symbols of each slot, a number of slots of each subframe, or a number of subframes of each frame. The transmitter 105-a may, in some implementations, choose an FFT size of the numerology to limit a complexity of the transmissions to the receiver 115-a over communication link 125-a. In some implementations, the transmitter 105-a may choose an FFT size that is below a limit (for example, 50,000). Additionally or alternatively, the transmitter 105-a may choose an FFT size that has a number of relatively small prime divisors (for example, 2, 3, or 5, among other examples).

In some implementations, the numerology may be a numerology of a set of numerologies. The transmitter 105-a may transmit the downlink resources using a numerology of the set of numerologies based on a type of the downlink resources. For example, the downlink resources may include resources for an MBMS. The transmitter 105-a may reserve one or more resources (for example, reserve a scheduling interval for the one or more resources) in a frame for transmitting an MBMS based on configuring the one or more resources as multicast-broadcast single-frequency network (MBSFN) subframes. Each MBSFN subframe may include an MBSFN region (for example, an MBSFN portion of a resource), a non-MBSFN region (for example, a non-MBSFN portion of a resource), or both. In some specific implementations, an MBSFN subframe may only include an MBSFN region. In some examples, an MBSFN region or portion may include a data portion or a payload portion and a non-MBSFN region or portion may include a CP portion.

The transmitter 105-a may transmit a carrier 205 in the downlink resources. In some implementations, the carrier 205 may be a dedicated MBMS carrier. The carrier 205 may include one or more frames 210, and each frame 210 may span a duration (for example, forty (40) milliseconds (ms)) in the time domain. In some implementations, the duration of a frame in a dedicated MBMS carrier may be different than the duration of a frame in a non-dedicated MBMS carrier. Each frame 210 may include a control resource 215 (for example, a control subframe) and a data region 220 (for example, a payload region). The control resource 215 may be associated with a scheduling interval and, in some implementations, may include a cell acquisition subframe (CAS) within the scheduling interval. The control resource 215 may include one or more of control information, system information (for example, general system information or a system information block (SIB), among other examples), synchronization signals, or other information. In some examples, the transmitter 105-a may transmit the control resource 215 periodically in the time resources (for example, every 40 ms). Each control resource 215 may span a first duration (for example, one (1) ms), with a second duration (for example, thirty-nine (39) ms) between each control resource 215 based on the scheduling interval used by the control resource 215. In some examples, the control resource 215 may be associated with a first numerology. The control information in the control resource 215 may indicate at least one characteristic of resources (for example, resources in the data region 220) in the frame 210 of the carrier 205. In some specific implementations, the characteristic may include a second numerology associated with the data region 220. The control resource 215 may span a frequency bandwidth (for example, fifteen (15) kilohertz (kHz)).

The data region 220 may include one or more payload resources and be associated with the second numerology. In some implementations, the second numerology may be different than the first numerology. The data region 220 may include an MBSFN region. The data region 220 may span a second duration (for example, more than 1 ms, such as thirty-nine (39) ms) based on a scheduling interval associated with the data region 220. The data region 220 may include a number of resources, and each resource may include one or more subframes, which may include one or more slots, which may further include one or more symbols. In some implementations, the number of resources in the data region 220 may be an integer.

In some examples, a resource may be one or more of a subframe, a slot, or a symbol. In some implementations, a resource may correspond to one subframe or one slot, or both. For example, the resource may correspond to one subframe, which may include one slot. In some aspects, the resource may include one slot and the slot may include one symbol. The resource may span a duration based on the second duration of the data region 220 and the number of resources included in the data region 220. In some specific implementations, the data region 220 may include thirteen (13) resources and each resource (for example, each subframe, slot, or symbol of the data region 220) may span 3 ms (for example, when the second duration is 39 ms).

Similarly, a scheduling interval may be an example of a duration of time used to communicate information. A scheduling interval may include one or more of a subframe, a slot, or a symbol. In some implementations, a scheduling interval may be associated with (or used by) a resource to define the time duration of the resource. For example, a resource may use a scheduling interval spanning a duration in time during which the resource may be transmitted or received, or both. In some cases, the scheduling interval may be a duration of time that spans one or more subframes, one or more slots, or one or more symbols.

The transmitter 105-a may be associated with a geographic coverage area 110-a in which communications with various receivers 115, including the receiver 115-a, is supported. In some broadcast systems that utilize the wireless communication system 200, an inter-site distance between the transmitter 105-a and another transmitter 105 or a receiver 115 may be relatively large (for example, 10 km, 50 km, 100 km, or more than 100 km, among other examples) compared to an inter-site distance for other implementations of the wireless communication system 200 (for example, cellular data or talk scenarios). As the inter-site distance increases, a signal quality of signals transmitted from the transmitter 105-a may be affected by an increased size of a channel delay spread, which may lead to an increased inter-symbol interference or other problems.

To improve support for broadcasting systems (for example, for MBMS resource transmissions) that use the wireless communication system 200, the transmitter 105-a may adjust numerologies in one or more carriers, such as dedicated MBMS carriers, which may include carrier 205. For example, the transmitter 105-a may adjust durations of the one or more symbols in the data region 220 to reduce the effects of channel delay spread. A duration of each symbol of the one or more symbols may include the duration of the CP portion and the duration of the data portion.

The carrier 205 may be associated with a sampling interval in the time domain. The receiver 115-a may take samples of signals received from the transmitter 105-a to extract transmitted information. The sampling interval may be defined as a period of time between a first sample taken by the receiver 115-a and a second sample taken by the receiver 115-a. The sampling interval may be based on the first numerology associated with the control resource 215. The duration of each symbol of the one or more symbols in the data region 220 may be an integer multiple of the sampling interval. Additionally, the duration of the CP portion associated with each symbol and the duration of the data portion associated with each symbol may each be an integer multiple of the sampling interval. In some examples, the sampling interval may be 1/(1024*15 kHz), or approximately 65.1 nanoseconds (ns). In some examples, the sampling interval may be 1/(2048*15 kHz), or approximately 32.6 ns.

The data region 220 may include a number of symbols N. In some implementations, a number of symbols $N_1$ (for example, 1, 2, or N, among other examples) of the N symbols may each span a first symbol duration in the time-domain, which includes a first CP portion duration and a first data portion duration, while a number $N_2$ (that is, $N-N_1$) symbols may each span a second symbol duration in the time-domain, which includes a second CP portion duration and a second data portion duration. In some implementations, the number $N_1$ may be one, such that one symbol spans a first symbol duration and each of the remaining $N_2$ symbols spans a second symbol duration. In other implementations, the numbers $N_1$ and $N_2$ may be chosen such that the first CP portion duration and the second CP portion duration are nearly equal. In still other examples, the number $N_1$ may be equal to N, such that each of the N symbols spans the first symbol duration.

Figure 3:
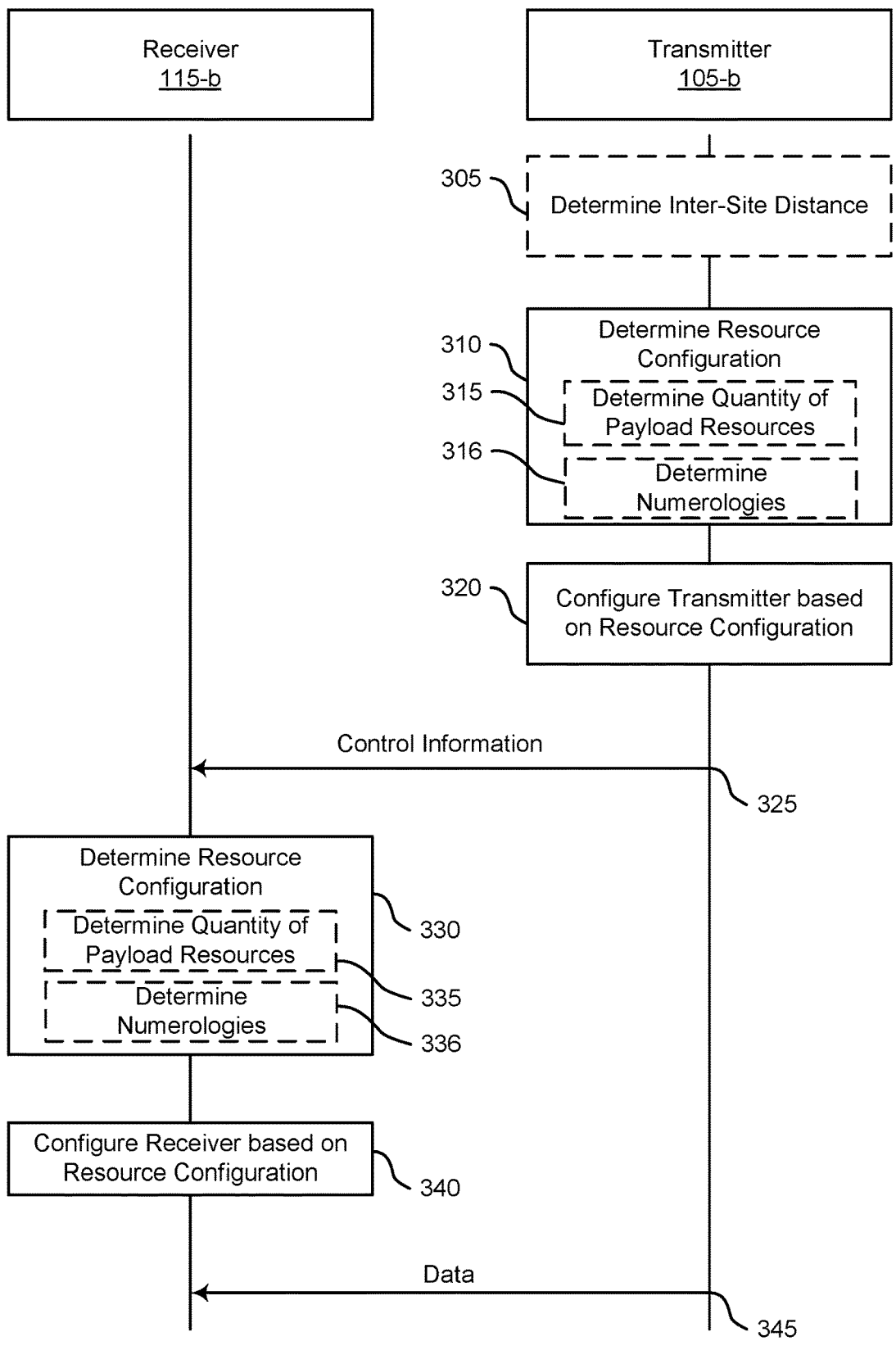
FIG. 3 illustrates an example of a process flow for numerologies that support broadcasting over a carrier in accordance with aspects of the present disclosure.

FIG. 3 illustrates an example of a process flow 300 for numerologies that support broadcasting over a carrier in accordance with aspects of the present disclosure. In some implementations, process flow 300 may implement aspects of wireless communication systems 100 or wireless communication system 200. Process flow 300 may include a receiver 115-b, which may be an example of a receiver 115-a, and a transmitter 105-b, which may be an example of a transmitter 105-a, as described with reference to FIG. 2. In some examples, the transmitters 105 may be examples of base stations and the receivers 115 may be examples of UEs. Transmitters 105 may be configured to both transmit and receive communications (such as, uplink and downlink communications) with the receivers 115. Similarly, the receivers 115 may be configured to both transmit and receive communications (such as, uplink and downlink communications) with the transmitters 105. In some implementations, the transmitters 105 may not be configured to receive information over specific carriers (such as MBMS-dedicated carriers) and the receivers 115 may not be configured to transmit information over the specific carriers (such as MBMS-dedicated carriers).

At 305, the transmitter 105-b may optionally determine an inter-site distance associated with the transmitter 105-b. In some examples, such as in broadcast systems, the inter-site distance between the transmitter 105-b and another device (for example, the receiver 115-b or another transmitter 105) may be relatively large (for example, 10 km, 50 km, 100 km, or more than 100 km, among other examples) compared to an inter-site distance for other scenarios in wireless communication systems (for example, cellular data or talk scenarios). As the inter-site distance increases, a signal quality of signals transmitted from the transmitter 105-b may be affected by an increased size of a channel delay spread, which may lead to an increased inter-symbol interference.

At 310, the transmitter 105-b may determine a configuration of resources in a frame of a carrier. The transmitter 105-b may identify that a control resource is associated with a first scheduling interval that spans a first duration (for example, 1 ms) in a time-domain and that a payload resource is associated with a second scheduling interval that spans a second duration (for example, more than 1 ms). The payload resource may include an MBSFN subframe. In some examples, the second duration may be longer than the first duration. In some implementations, the control resource may include a CAS. In some implementations, the second duration may be an integer multiple of a sampling interval associated with the carrier. In some aspects, the carrier may be an MBMS carrier (for example, an MBMS-dedicated carrier). In some specific implementations, a duration of the frame may be 40 ms. In some implementations, the transmitter 105-b may determine the configuration of the resources based on determining the inter-site distance associated with the transmitter 105-b.

In some implementations, the transmitter 105-b may determine the first duration and the second duration based on the inter-site distance associated with the transmitter 105-b. For example, as the inter-site distance increases, the transmitter 105-b may determine to increase the first duration or the second duration, in order to reduce the effects of channel delay spread.

At 315, the transmitter 105-b may determine a quantity of payload resources in the frame as part of determining the configuration of the resources in the frame of the carrier. The transmitter may have some flexibility in determining the number of resources (for example, subframes, slots or symbols) in a payload portion of the frame based on techniques described herein. For example, if the transmitter 105-b determines to increase the second duration based on determining the inter-site distance, the transmitter may determine to decrease the quantity of payload resources in order to include the payload resources in the 40 ms frame. In some examples, the transmitter 105-b may determine that the payload resource spans (or uses or is otherwise associated with the second scheduling interval that spans) the second duration based on determining the quantity of the payload resources in the frame. In some implementations, the transmitter 105-b may determine that a first payload resource spans the second duration in the time-domain and a second payload resource spans a third duration in the time-domain. In some specific implementations, the third duration may be different than the second duration and longer than the first duration.

In some implementations, the transmitter 105-b may determine a first set of payload resources and a second set of payload resources. The transmitter 105-b may determine that each payload resource of the first set of payload resources spans the second duration, and that each payload resource of the second set of payload resources spans the third duration. The first set of payload resources may include a first number of resources, while the second set of payload resources may include a second number of resources. In some implementations, the second set of payload resources may include a single payload resource. The transmitter 105-b may determine the first set of payload resources and the second set of payload resources such that the 40 ms frame may include the control resource, the first set of payload resources, and the second set of payload resources.

The transmitter 105-b may determine durations of symbols and portions of symbols in the quantity of payload resources as a part of determining the quantity of payload resources and the configuration of the resources of the carrier. In some implementations, the transmitter 105-b may determine that the payload resource includes a single symbol that spans the second duration. In some implementations, the transmitter 105-b may determine that a first portion of the symbol (for example, the CP portion) spans a first portion duration, while a second portion of the symbol (for example, the data portion or a payload portion) spans a second portion duration. In some implementations, the second portion duration may be longer than the first portion duration. The first portion duration may be a first integer multiple of the sampling interval and the second portion duration may be a second integer multiple of the sampling interval. In some implementations, the second integer multiple of the sampling interval may be greater than the first integer multiple of the sampling interval.

At 316, the transmitter 105-b may determine numerologies for the resources as part of determining the configuration of the resources in the frame of the carrier. The numerologies may be used to define the configuration of the payload resources in the frame, which may be or include the MBMS frame. In some implementations, an MBMS frame may include frames that use different numerologies. For example, the control resource (for example, CAS) may use a first numerology (for example, a legacy 15 kHz numerology) and the payload resources may use a second numerology different than the first numerology. The transmitter 105-b may determine a first numerology associated with the control resource and a second numerology associated with the payload resource. In some examples, the second numerology may be different than the first numerology. In some examples, the second numerology for the payload resources may define two or more configurations for the payload resources. As such, payload resources using the same numerology may have different configurations within the same frame.

In some implementations, the quantity of payload resources may include a number of symbols N. The first set of payload resources may include a first number of symbols $N_1$ (for example, 1, 2, or N, among other examples) of the N symbols. Each symbol of the $N_1$ symbols may span the second duration. A first portion (for example, the CP portion) of each symbol of the $N_1$ symbols may span the first portion duration and a second portion (for example, the data portion or the payload portion) may span the second portion duration. The second set of payload resources may include a second number of symbols $N_2$ (for example, $N-N_1$). Each symbol of the $N_2$ symbols may span the third duration. A third portion (for example, the CP portion) of each symbol of the $N_2$ symbols may span a third portion duration and a fourth portion (for example, the data portion or the payload portion) may span a fourth portion duration. In a first numbering case, the transmitter 105-b may determine the numbers $N_1$ and $N_2$ such that the first portion duration and the third portion duration are equal or nearly equal. In a second numbering case, the number $N_2$ may be one, such that one symbol spans the third duration and each of the remaining $N_1$ symbols in the quantity of payload resources spans the second duration. In a third numbering case, the number $N_1$ may be equal to N, such that each of the N symbols spans the second duration.

In an implementation, the transmitter 105-b may determine that the quantity of payload resources includes 14 symbols (that is, N=14). As a part of determining the second numerology associated with the payload resource, the transmitter 105-b may further determine a number of parameters associated with the second numerology. The transmitter 105-b may determine to use an FFT size of 36864, which has prime divisors 2 and 3. The transmitter 105-b may determine to use a sampling interval of 1/(1024*15 kHz), or approximately 65.1 ns. The transmitter 105-b may determine to use a carrier spacing of (1024*15 kHz)/36864 (such that 36864 is the FFT size), or approximately 416.67 Hz. The transmitter 105-b may determine that the second portion duration and the fourth portion duration are the inverse of the carrier spacing, or 2.4 ms, which is 73728 sampling intervals. The transmitter 105-b may determine one or more of $N_1$, $N_2$, the first portion duration, or the third portion duration based on the numerology and the parameters associated with the numerology. In the first numbering case, the transmitter 105-b may determine that the first set of payload resources includes 2 resources (that is, $N_1$=2). Accordingly, in some examples, the first portion duration is 11850 sampling intervals and the second set of payload resources includes 12 resources (that is, $N_2$=12). In such examples, the third portion duration is 11849 sampling intervals. In the second numbering case, the transmitter 105-*b* may determine that the first set of payload resources includes 13 resources (that is, $N_1$=13). Accordingly, in some examples, the first portion duration is 11849 sampling intervals and the second set of payload resources includes 1 resource (that is, $N_2$=1). In such examples, the third portion duration is 11851 sampling intervals.

In another implementation, the transmitter 105-*b* may determine that the quantity of payload resources includes 13 subframes, slots, or symbols (that is, N=13). As a part of determining the second numerology associated with the payload resource, the transmitter 105-*b* may further determine a number of parameters. The transmitter 105-*b* may determine to use an FFT size of 41472, which has prime divisors 2 and 3. The transmitter 105-*b* may determine to use a sampling interval of 1/(1024*15 kHz), or approximately 65.1 ns. The transmitter 105-*b* may determine to use a carrier spacing of (1024*15 kHz)/41472 (such that 41472 is the FFT size), or approximately 370.37 Hz. The transmitter 105-*b* may determine that the second portion duration and the fourth portion duration are the inverse of the carrier spacing, or 2.7 ms, which is 82944 sampling intervals. The transmitter 105-*b* may determine that each of the 13 symbols spans the second duration, or 3 ms. The transmitter 105-*b* may further determine the first portion duration based on the second numerology and the parameters associated with the second numerology. In the third numbering case, the transmitter 105-*b* may determine that the first portion duration is 9216 sampling intervals.

In a further implementation, the transmitter 105-*b* may determine that the quantity of payload resources includes 11 subframes, slots, or symbols (that is, N=1114). As a part of determining the second numerology associated with the payload resource, the transmitter 105-*b* may further determine a number of parameters associated with the second numerology. The transmitter 105-*b* may determine to use an FFT size of 49152, which has prime divisors 2 and 3. The transmitter 105-*b* may determine to use a sampling interval of 1/(1024*15 kHz), or approximately 65.1 ns. The transmitter 105-*b* may determine to use a carrier spacing of (1024*15 kHz)/49152 (such that 49152 is the FFT size), or 312.5 Hz. The transmitter 105-*b* may determine that the second portion duration and the fourth portion duration are the inverse of the carrier spacing, or 3.2 ms, which is 98304 sampling intervals. The transmitter 105-*b* may determine $N_1$, $N_2$, the first portion duration, and the third portion duration based on the second numerology and the parameters associated with the second numerology. In the first numbering case, the transmitter 105-*b* may determine that the first set of payload resources includes four (4) resources (that is, $N_1$=4). Accordingly, in some examples, the first portion duration is 10613 sampling intervals and the second set of payload resources includes 7 resources (that is, $N_2$=7). In such examples, the third portion duration is 10612 sampling intervals. In the second numbering case, the transmitter 105-*b* may determine that the first set of payload resources includes 13 resources (that is, $N_1$=3). Accordingly, in some examples, the first portion duration is 11616 sampling intervals and the second set of payload resources includes one (1) resource (that is, $N_{2=1}$). In such examples, the third portion duration is 10612 sampling intervals.

At 320, the transmitter 105-*b* may be configured based on the configuration of the resources. Before the transmitter 105-*b* can broadcast information over an MBMS-dedicated carrier or cell, the transmitter 105-*b* may configure its antennas and other radio frequency equipment to transmit data according to the resource configuration. In some implementations, the transmitter 105-*b* may be configured based on determining that the control resource spans the first duration and the payload resource spans the second duration.

At 325, the transmitter 105-*b* may transmit, and the receiver 115-*b* may receive, system information. The system information may indicate at least one characteristic of resources in the frame of the carrier. The system information may indicate the duration of a control resource, a numerology associated with a control resource, a numerology associated with payload resources, a quantity of payload resources, types of payload resources, the quantities of different types of payload resources, the duration of symbols in payload resources, the durations of portions of symbols, or combinations thereof. For example, the system information may indicate the first duration of the control resource and the second duration of the payload resource based on the transmitter 105-*b* determining the first duration and the second duration. In some implementations, the transmitter 105-*b* may transmit the system information in a SIB. In some implementations, the transmitter 105-*b* may transmit the system information in SystemInformationBlockType1-MBMS. In some implementations, the system information may include an information element dedicated to the at least one characteristic of payload resources in the frame of a carrier. In some implementations, the SystemInformation-BlockType1-MBMS may include an information element that indicates the second duration of the second scheduling interval. In some implementations, transmitter 105 may transmit the system information based on configuring the transmitter 105-*b*. In some examples, the system information may include one or more of a numerology of the frame, the control resource, or the payload resource. In some implementations, the durations of the quantity of resources may be configurable based on the control information.

At 330, the receiver 115-*b* may determine the configuration of resources in the frame based on receiving the system information. The receiver 115-*b* may identify that the first scheduling interval spans the first duration (for example, 1 ms) and that the second scheduling interval spans the second duration (for example, more than 1 ms). The payload resource may include an MBSFN subframe. In some implementations, the second duration may be longer than the first duration. In some implementations, the control resource may include a CAS. In some examples, the second duration may be an integer multiple of a sampling interval associated with the carrier. In some implementations, the duration of the frame may be 40 ms.

At 335, the receiver 115-*b* may determine the quantity of payload resources in the frame as part of determining the configuration of the resources in the frame of the carrier. The receiver 115-*b* may determine the quantity of payload resources based on the received system information. The receiver 115-*b* may have some flexibility in determining the number of resources (for example, the number of subframes, slots, or symbols) in a payload region of the frame based on techniques described herein. For example, if the transmitter 105-*b* determines to increase the second duration based on determining the inter-site distance, the transmitter 105-*b* may determine to decrease the quantity of payload resources in order to include the payload resources in the 40 ms frame. In some implementations, the receiver 115-*b* may determine that the payload resource spans the second duration based on determining the quantity of the payload resources in the frame. In some implementations, the receiver 115-*b* may determine that a first payload resource spans the second duration in the time-domain and a second payload resource spans a third duration in the time-domain. In some implementations, the third duration may be different than the second duration and longer than the first duration.

In some examples, the receiver 115-*b* may determine a first set of payload resources and a second set of payload resources. The receiver 115-*b* may determine that each payload resource of the first set of payload resources spans the second duration, and that each payload resource of the second set of payload resources spans the third duration. The first set of payload resources may include a first number of resources, while the second set of payload resources may include a second number of resources. In some examples, the second set of payload resources may include a single payload resource.

The receiver 115-*b* may determine, based on the received system information, durations of symbols, or durations of portions of symbols in the payload resources, or both as a part of determining the quantity of payload resources and the configuration of the resources of the frame. In some implementations, the receiver 115-*b* may determine that the second scheduling interval includes a single symbol that spans the second duration. In some implementations, the receiver 115-*b* may determine that a first portion of the symbol (for example, the CP portion) spans a first portion duration, while a second portion of the symbol (for example, the data portion or a payload portion) spans a second portion duration. In some implementations, the second portion duration may be longer than the first portion duration. The first portion duration may be a first integer multiple of the sampling interval and the second portion duration may be a second integer multiple of the sampling interval. In some implementations, the second integer multiple of the sampling interval may be greater than the first integer multiple of the sampling interval.

At 316, the receiver 115-*b* may determine numerologies for the resources as part of determining the configuration of the resources in the frame of the carrier. The receiver 115-*b* may determine the numerologies based on the received system information. The numerologies may be used to define the configuration of the payload resources in the MBMS frame. In some implementations, a frame, such as an MBMS frame, may include frames that use different numerologies. For example, the control resource (for example, CAS) may use a first numerology (for example, a 15 kHz numerology) and the payload resources may use a second numerology different than the first numerology. The receiver 115-*b* may determine a first numerology associated with the control resource and a second numerology associated with the payload resource. In some examples, the second numerology may be different than the first numerology. In some implementations, the second numerology for the payload resources may define two or more configurations for the payload resources. As such, payload resources using the same numerology may have different configurations within the same frame.

In some implementations, the quantity of payload resources may include a number of symbols N. The first set of payload resources may include a first number of symbols $N_1$ (for example, 1, 2, or N, among other examples) of the N symbols. Each symbol of the $N_1$ symbols may span the second duration. A first portion (for example, the CP portion) of each symbol of the $N_1$ symbols may span the first portion duration and a second portion (for example, the data portion or the payload portion) may span the second portion duration. The second set of payload resources may include a second number of symbols $N_2$ (for example, $N-N_1$). Each symbol of the $N_2$ symbols may span the third duration. A third portion (for example, the CP portion) of each symbol of the $N_2$ symbols may span a third portion duration and a fourth portion (for example, the data portion or the payload portion) may span a fourth portion duration. In a first numbering case, the receiver 115-*b* may determine the numbers $N_1$ and $N_2$ such that the first portion duration and the third portion duration are equal or nearly equal. In a second numbering case, the number $N_2$ may be one, such that one symbol spans the third duration and each of the remaining $N_1$ symbols in the quantity of payload resources the second duration. In a third numbering case, the number $N_1$ may be equal to N, such that each of the N symbols spans the second duration.

At 340, the receiver 115-*b* may be configured based on the configuration of the resources. Before the receiver 115-*b* can receive data over an MBMS-dedicated carrier or cell, the receiver 115-*b* may configure its antennas and other radio frequency equipment to receive the data according the resource configuration. In some implementations, the receiver 115-*b* may be configured based on determining that the control resource spans the first duration and the payload resource spans the second duration.

At 345, the transmitter 105-*b* may transmit, and the receiver 115-*b* may receive, data over the frame. The data may include the control and payload resources. The transmitter 105-*b* may transmit the data over the carrier based on transmitting the system information. The transmitter 105-*b* may transmit the data based on determining durations associated with one or more of the subframes, slots, or symbols, associated with the resources in the frame. Additionally or alternatively, the transmitter 105-*b* may transmit the data based on configuring the transmitter 105-*b*. The receiver 115-*b* may receive the data based on configuring the receiver 115-*b*. In some implementations, the receiver 115-*b* may receive the data based on determining a numerology associated with a resource of the frame.

FIGS. 4A and 4B illustrate examples of transmission frames 400 for numerologies that support broadcasting over a carrier in accordance with aspects of the present disclosure. In some examples, transmission frames 400 may implement aspects of wireless communications system 100 or wireless communication system 200.

A transmission frame of a carrier may include a control resource including one or more symbols each having a first duration. The transmission frame further includes a quantity of payload resources including a number of symbols N. A first set of the payload resources may include a first number of symbols $N_1$ (for example, 1, 2, or N, among other examples) of the N symbols. Each symbol of the $N_1$ symbols may span a second duration. A first portion (for example, a CP portion) of each symbol of the $N_1$ symbols may span a first portion duration and a second portion (for example, a data portion or a payload portion) may span a second portion duration. A second set of the payload resources may include a second number of symbols $N_2$ (for example, $N-N_1$). Each symbol of the $N_2$ symbols may span a third duration. A third portion (for example, the CP portion) of each symbol of the $N_2$ symbols may span a third portion duration and a fourth portion (for example, the data portion or the payload portion) may span a fourth portion duration.

FIG. 4A shows a transmission frame 400-*a* in which the number $N_2$ is one such that one symbol spans the third duration and each of the remaining $N_1$ symbols in the quantity of payload resources spans the second duration. The transmission frame 400-*a* may include a control resource 215-*a* and a data region 220-*a*. The transmission frame 400-*a* may span a duration (for example, 40 ms). The control resource 215-*a* may include a CAS. The control resource 215-*a* may include one or more of control information, system information (for example, general system information or a SIB, among other examples), synchronization signals, or other information. The control resource 215-*a* may span a first duration (for example, 1 ms). The control resource 215-*a* may be associated with a first numerology. The control information in the control resource 215-*a* may indicate at least one characteristic of resources (for example, the data region 220-*a*) in the transmission frame 400-*a*. The characteristic may include a second numerology associated with the data region 220-*a*. The control resource 215-*a* may span a frequency bandwidth (for example, 15 kHz).

The data region 220-*a* may include payload resources and be associated with the second numerology. In some implementations, the second numerology may be different than the first numerology. The data region 220-*a* may include an MBSFN region. The data region 220-*a* may span a duration, for example, more than 1 ms, such as 39 ms. The data region 220-*a* may include a number of symbols. In some examples, the number of symbols may be an integer.

As shown in FIG. 4A, the data region 220-*a* may include four symbols. A first symbol may span a symbol duration 405-*a* in the time-domain and each symbol duration 405-*a* may include a CP portion duration 410-*a* and a data portion duration 415-*a*, while each of the remaining symbols may span a symbol duration 405-*b* in the time-domain and each symbol duration 405-*b* may include a CP portion duration 410-*b* and a data portion duration 415-*b*.

FIG. 4B shows a transmission frame 400-*b* in which the numbers $N_1$ and $N_2$ are determined such that the first portion duration and the third portion duration are approximately equal. The transmission frame 400-*b* may include a control resource 215-*b* and a data region 220-*b*. The transmission frame 400-*b* may span a duration (for example, 40 ms). The control resource 215-*b* may include a CAS. The control resource 215-*b* may include one or more of control information, system information (for example, general system information or a SIB, among other examples), synchronization signals, or other information. The control resource 215-*b* may span a first duration (for example, 1 ms). The control resource 215-*b* may be associated with a first numerology. The control information in the control resource 215-*b* may indicate at least one characteristic of resources (for example, the data region 220-*b*) in the transmission frame 400-*b*. The characteristic may include a second numerology associated with the data region 220-*b*. The control resource 215-*b* may span a frequency bandwidth (for example, 15 kHz).

The data region 220-*b* may include payload resources and be associated with the second numerology. In some implementations, the second numerology may be different than the first numerology. The data region 220-*b* may include an MBSFN region. The data region 220-*b* may span a duration, for example, more than 1 ms, such as 39 ms. The data region 220-*b* may include a number of symbols. In some examples, the number of symbols may be an integer.

As shown in FIG. 4B, the data region 220-*b* may include six symbols. Three of the symbols may span a symbol duration 405-*c* in the time-domain and each symbol duration 405-*c* may include a CP portion duration 410-*c* and a data portion duration 415-*c*, while each of the remaining three symbols may span a symbol duration 405-*d* in the time-domain and each symbol duration 405-*d* may include a CP portion duration 410-*d* and a data portion duration 415-*d*.

Figure 5:
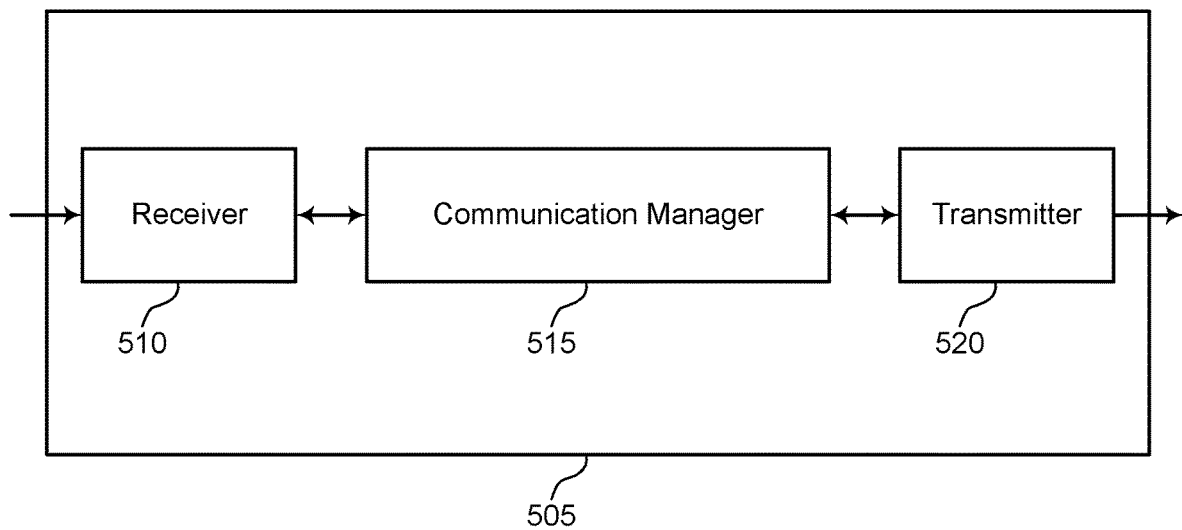
FIGS. 5 and 6 show block diagrams of devices for numerologies that support broadcasting over a carrier in accordance with aspects of the present disclosure.

FIG. 5 shows a block diagram of a device 505 that supports numerologies for broadcasting over a carrier in accordance with aspects of the present disclosure. The device 505 may be an example of aspects of a receiver or a UE as described herein. The device 505 may include a receiver 510, a communication manager 515, and a transmitter 520. The communication manager 515 may be implemented, at least in part, by one or both of a modem and a processor. Each of these components may be in communication with one another (for example, via one or more buses).

The receiver 510 may receive information such as packets, user data, or control information associated with various information channels (for example, control channels, data channels, and information related to numerologies that support broadcasting over a carrier, among other examples). Information may be passed on to other components of the device 505. The receiver 510 may be an example of aspects of the transceiver 820 described with reference to FIG. 8. The receiver 510 may utilize a single antenna or a set of antennas.

The communication manager 515 may receive system information that indicates at least one characteristic of resources in a frame of a carrier, determine, based on receiving the system information, that a control resource of the resources is associated with a first scheduling interval that spans a first duration in a time-domain and that a payload resource of the resources is associated with a second scheduling interval that spans a second duration in the time-domain greater than the first duration, and receive, over the carrier, the control resource and the payload resource. The communication manager 515 may be an example of aspects of the communication manager 810 described herein.

The communication manager 515, or its sub-components, may be implemented in hardware, code (for example, software or firmware) executed by a processor, or any combination thereof. If implemented in code executed by a processor, the functions of the communication manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communication manager 515, or its sub-components, may be physically located at different locations, including being distributed such that portions of functions are implemented at different physical locations by one or more physical components. In some examples, the communication manager 515, or its sub-components, may be a separate and distinct component in accordance with various aspects of the present disclosure. In some examples, the communication manager 515, or its sub-components, may be combined with one or more other hardware components.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

Figure 6:
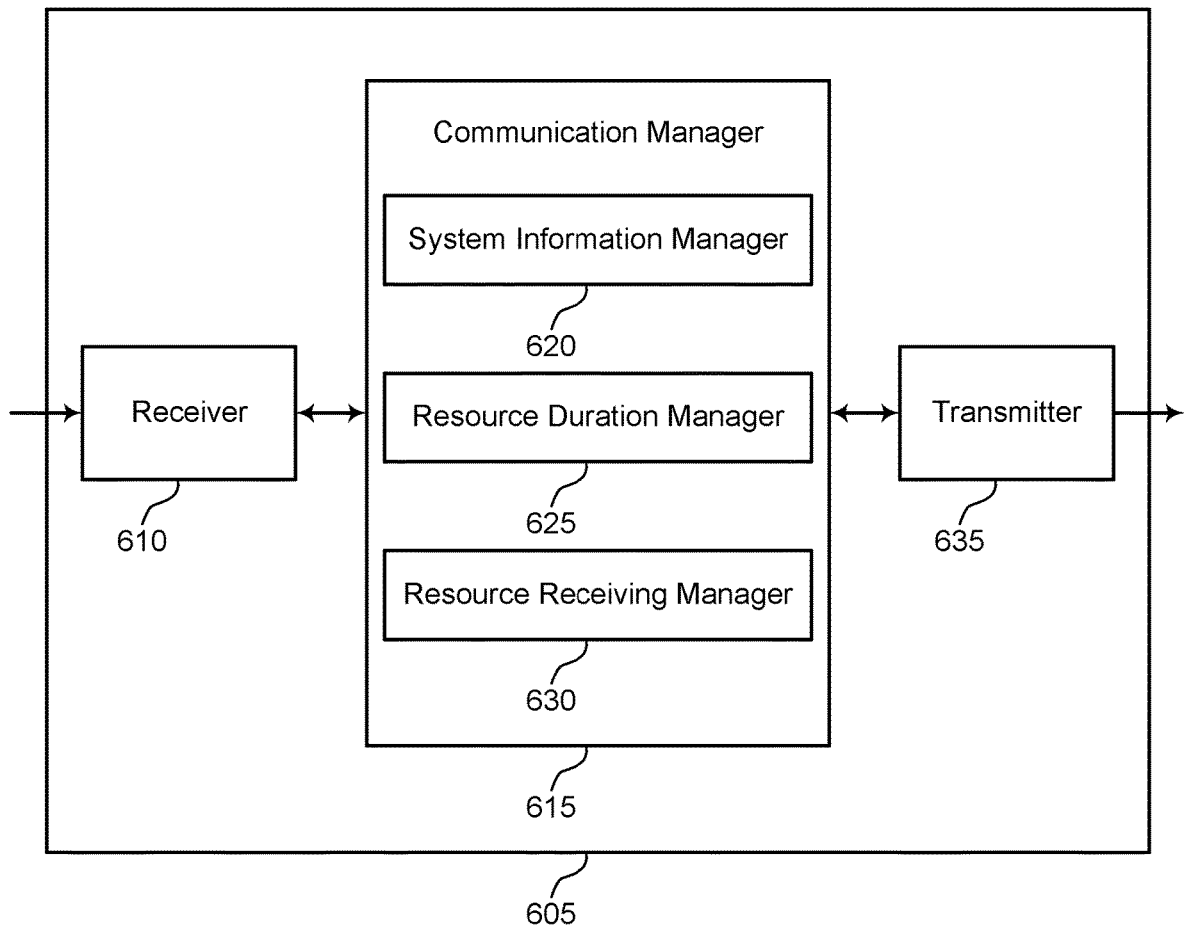

FIG. 6 shows a block diagram of a device 605 that supports numerologies for broadcasting over a carrier in accordance with aspects of the present disclosure. The device 605 may be an example of aspects of a device 505, a receiver 115, or a UE as described herein. The device 605 may include a receiver 610, a communication manager 615, and a transmitter 635. The communication manager 615 may be implemented, at least in part, by one or both of a modem and a processor. Each of these components may be in communication with one another (for example, via one or more buses).

The receiver 610 may receive information such as packets, user data, or control information associated with various information channels (for example, control channels, data channels, and information related to numerologies that support broadcasting over a carrier, among other examples). Information may be passed on to other components of the device 605. The receiver 610 may be an example of aspects of the transceiver 820 described with reference to FIG. 8. The receiver 610 may utilize a single antenna or a set of antennas.

The communication manager 615 may be an example of aspects of the communication manager 515 as described herein. The communication manager 615 may include a system information manager 620, a resource duration manager 625, and a resource receiving manager 630. The communication manager 615 may be an example of aspects of the communication manager 810 described herein.

The system information manager 620 may receive system information that indicates at least one characteristic of resources in a frame of a carrier. The resource duration manager 625 may determine, based on receiving the system information, that a control resource of the resources is associated with a first scheduling interval that spans a first duration in a time-domain and that a payload resource of the resources is associated with a second scheduling interval that spans a second duration in the time-domain greater than the first duration.

The resource receiving manager 630 may receive, over the carrier, the control resource and the payload resource. The transmitter 635 may transmit signals generated by other components of the device 605. In some examples, the transmitter 635 may be collocated with a receiver 610 in a transceiver component. For example, the transmitter 635 may be an example of aspects of the transceiver 820 described with reference to FIG. 8. The transmitter 635 may utilize a single antenna or a set of antennas.

Figure 7:
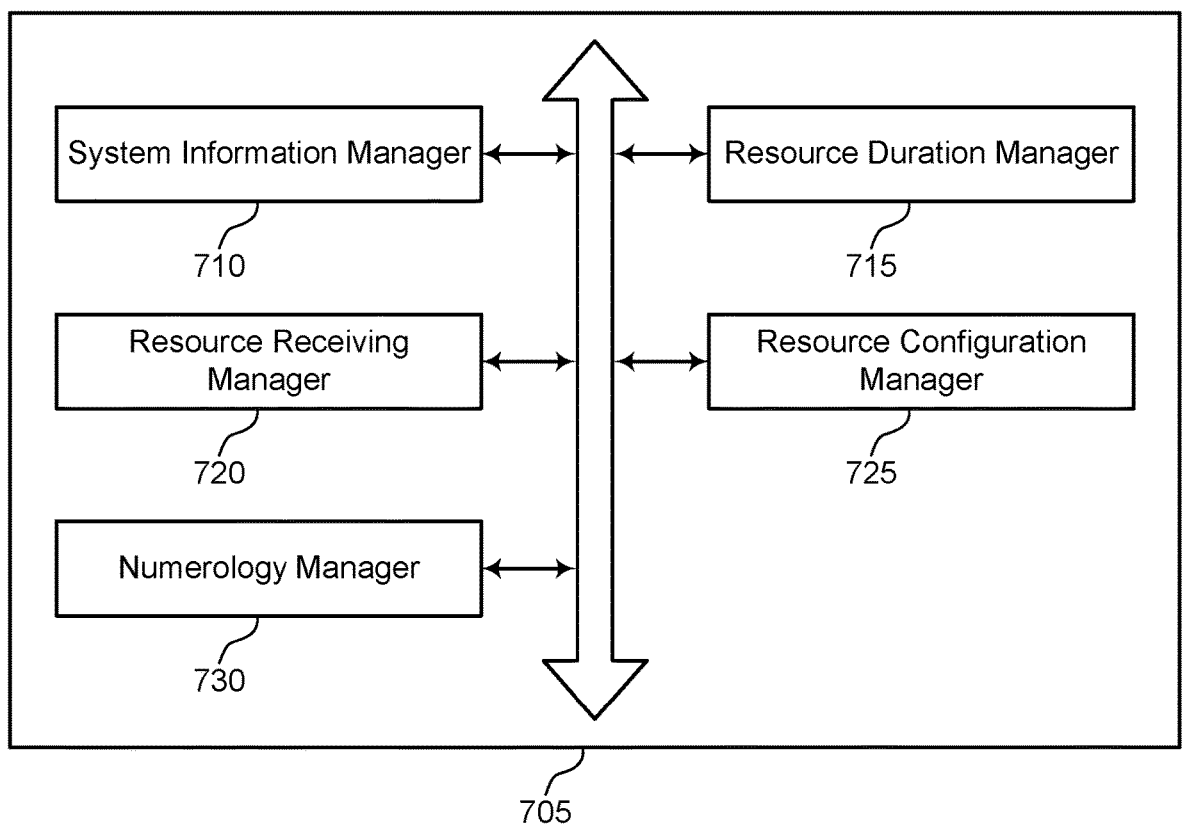
FIG. 7 shows a block diagram of a communication manager for numerologies that support broadcasting over a carrier in accordance with aspects of the present disclosure.

FIG. 7 shows a block diagram of a communication manager 705 that supports numerologies for broadcasting over a carrier in accordance with aspects of the present disclosure. The communication manager 705 may be an example of aspects of a communication manager 515, a communication manager 615, or a communication manager 810 described herein. The communication manager 705 may include a system information manager 710, a resource duration manager 715, a resource receiving manager 720, a resource configuration manager 725, and a numerology manager 730. Each of these components may communicate, directly or indirectly, with one another (for example, via one or more buses).

The system information manager 710 may receive system information that indicates at least one characteristic of resources in a frame of a carrier. In some examples, the system information manager 710 may receive a SIB that includes the system information. In some examples, the system information may include one or more of a numerology of the frame or a quantity of payload resources in the frame. In some examples, the system information includes SystemInformationBlockType1-MBMS. In some examples, the SystemInformationBlockType1-MBMS includes an information element that indicates the second duration of the second scheduling interval.

The resource duration manager 715 may determine, based on receiving the system information, that a control resource of the resources is associated with a first scheduling interval that spans a first duration in a time-domain and that a payload resource of the resources is associated with a second scheduling interval that spans a second duration in the time-domain greater than the first duration. In some examples, the resource duration manager 715 may determine that a first payload resource spans the second duration in the time-domain and a second payload resource spans a third duration in the time-domain different than the second duration and greater than the first duration. In some examples, receiving the control resource and the payload resource is based on determining that the first payload resource spans the second duration and the second payload resource spans the third duration. In some examples, the resource duration manager 715 may determine that each payload resource of a second set of payload resources spans a third duration in the time-domain different than the second duration.

In some examples, the resource duration manager 715 may determine that a first portion of the single symbol spans a third duration in the time-domain and a second portion of the single symbol spans a fourth duration in the time-domain that is greater than the third duration. In some examples, receiving the control resource and the payload resource is based on determining the third duration and the fourth duration.

In some examples, a duration of the second scheduling interval may be configurable based on the system information. In some examples, the third duration may be a first integer multiple of a sampling interval associated with the carrier. In some examples, the fourth duration may be a second integer multiple of the sampling interval greater than the first integer multiple. In some examples, the third duration may be greater than 200 microseconds. In some examples, the fourth duration may be greater than 800 microseconds. In some examples, the second duration of the second scheduling interval may be an integer multiple of a sampling interval associated with the carrier. In some examples, the first duration associated with the first scheduling interval may be one millisecond. In some examples, the second duration associated with the second scheduling interval may be greater than one millisecond. In some examples, a duration of the frame in the time-domain may be forty milliseconds.

The resource receiving manager 720 may receive, over the carrier, the control resource and the payload resource. In some examples, the resource receiving manager 720 may configure a receiver based on determining that the control resource spans the first duration and the payload resource spans the second duration. In some examples, receiving the control resource and the payload resource is based on configuring the receiver. In some examples, the carrier may include an MBMS carrier. In some examples, the MBMS carrier may be an MBMS-dedicated carrier.

The resource configuration manager 725 may determine a quantity of payload resources in the frame based on the system information. In some examples, determining that the second scheduling interval spans the second duration is based on determining the quantity of payload resources in the frame. In some examples, the resource configuration manager 725 may determine a first quantity of payload resources of a first type based on the system information. In some examples, the payload resources of the first type include the payload resource.

In some examples, the resource configuration manager 725 may determine a second quantity of payload resources of a second type based on the system information. In some examples, determining that the payload resource spans the second duration is based on determining the first quantity and the second quantity. In some examples, the resource configuration manager 725 may determine, based on the system information, that the payload resource includes a single symbol that spans the second duration. In some examples, receiving the control resource and the payload resource is based on determining that the second scheduling interval includes the single symbol. In some examples, the second set of payload resources may include a single payload resource.

In some examples, the first set of payload resources may include a set of payload resources and the second set of payload resources may include a set of payload resources. In some examples, the first portion of the single symbol may include a cyclic prefix of the single symbol. In some examples, the second portion of the single symbol may include a payload of the single symbol. In some examples, the second scheduling interval may include an MBSFN subframe. In some examples, the first scheduling interval may include a non-MBSFN subframe. In some examples, the first scheduling interval may include a CAS.

The numerology manager 730 may determine a first numerology associated with the control resource and a second numerology associated with the payload resource different than the first numerology. In some examples, receiving the control resource and the payload resource is based on determining the first numerology and the second numerology.

Figure 8:
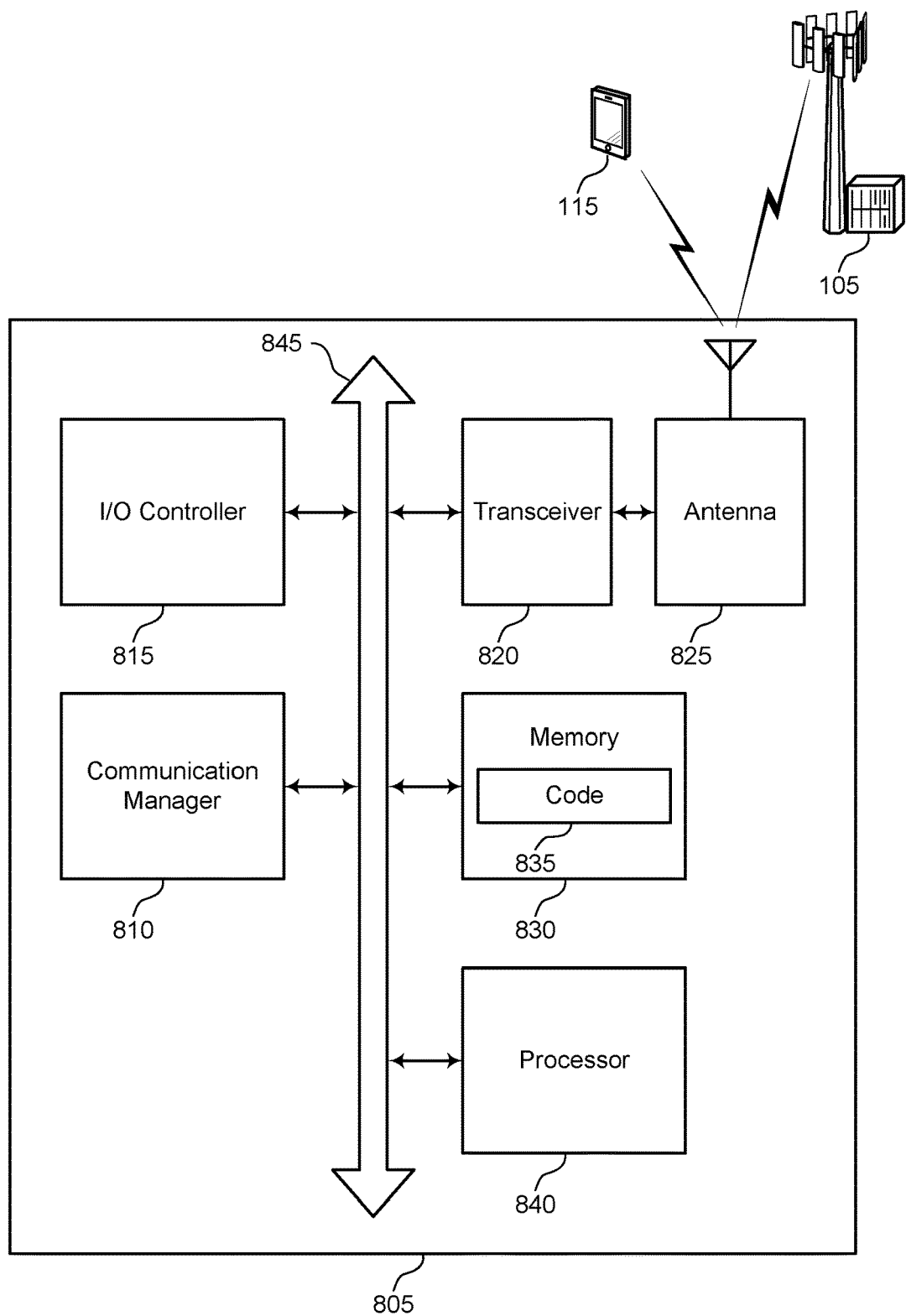
FIG. 8 shows a diagram of a system including a device for numerologies that support broadcasting over a carrier in accordance with aspects of the present disclosure.

FIG. 8 shows a diagram of a system including a device 805 that supports numerologies for broadcasting over a carrier in accordance with aspects of the present disclosure. The device 805 may be an example of or include the components of device 505, device 605, a receiver 115, or a UE as described herein. The device 805 may include components for bi-directional voice and data communications including components for transmitting and receiving communications, including a communication manager 810, an input/output (I/O) controller 815, a transceiver 820, an antenna 825, memory 830, and a processor 840. These components may be in electronic communication via one or more buses (for example, bus 845).

The communication manager 810 may receive system information that indicates at least one characteristic of resources in a frame of a carrier, determine, based on receiving the system information, that a control resource of the resources is associated with a first scheduling interval that spans a first duration in a time-domain and that a payload resource of the resources is associated with a second scheduling interval that spans a second duration in the time-domain greater than the first duration, and receive, over the carrier, the control resource and the payload resource.

The I/O controller 815 may manage input and output signals for the device 805. The I/O controller 815 may also manage peripherals not integrated into the device 805. In some examples, the I/O controller 815 may represent a physical connection or port to an external peripheral. In some examples, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some examples, the I/O controller 815 may be implemented as part of a processor. In some examples, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some examples, the wireless device may include a single antenna 825. However, in some examples the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some examples, the memory 830 may contain, among other things, a basic (I/O) system (BIOS) which may control basic hardware or software operation such as the interaction with peripheral components or devices.

The processor 840 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 840 may be configured to operate a memory array using a memory controller. In other cases, a memory controller may be integrated into the processor 840. The processor 840 may be configured to execute computer-readable instructions stored in a memory (for example, the memory 830) to cause the device 805 to perform various functions (for example, functions or tasks supporting numerologies that support broadcasting over a carrier).

The code 835 may include instructions to implement aspects of the present disclosure, including instructions to support wireless communications. The code 835 may be stored in a non-transitory computer-readable medium such as system memory or other type of memory. In some examples, the code 835 may not be directly executable by the processor 840 but may cause a computer (for example, when compiled and executed) to perform functions described herein.

Figure 9:
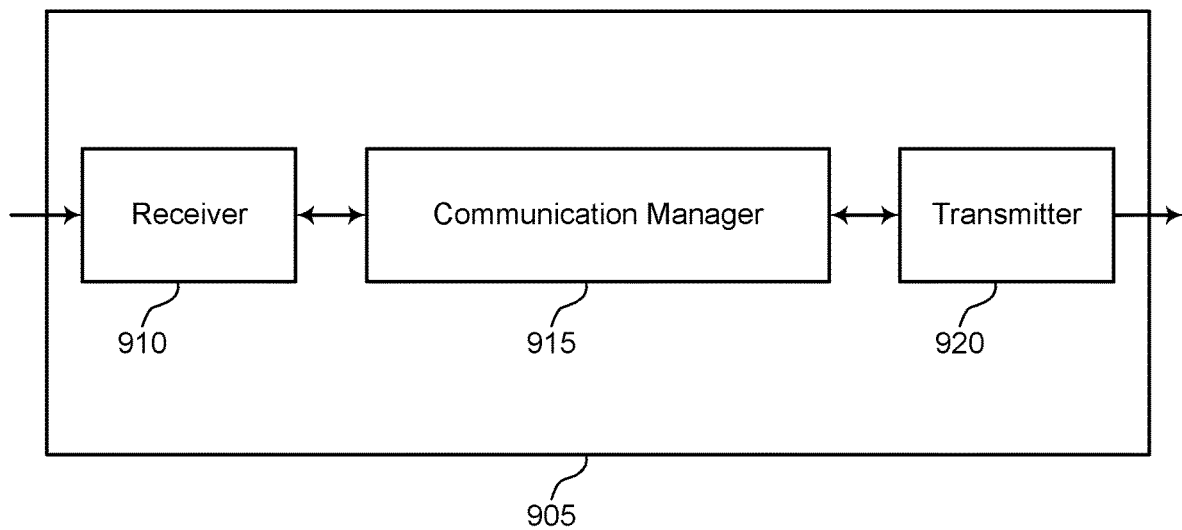
FIGS. 9 and 10 show block diagrams of devices for numerologies that support broadcasting over a carrier in accordance with aspects of the present disclosure.

FIG. 9 shows a block diagram of a device 905 that supports numerologies for broadcasting over a carrier in accordance with aspects of the present disclosure. The device 905 may be an example of aspects of a transmitter 105 or a base station as described herein. In some implementations, the functions of the device 905 may be performed by one or more of a base station or one or more network components associated with the base station. The device 905 may include a receiver 910, a communication manager 915, and a transmitter 920. The communication manager 915 may be implemented, at least in part, by one or both of a modem and a processor. Each of these components may be in communication with one another (for example, via one or more buses).

The receiver 910 may receive information such as packets, user data, or control information associated with various information channels (for example, control channels, data channels, and information related to numerologies that support broadcasting over a carrier, among other examples). Information may be passed on to other components of the device 905. The receiver 910 may be an example of aspects of the transceiver 1220 described with reference to FIG. 12. The receiver 910 may utilize a single antenna or a set of antennas.

The communication manager 915 may transmit system information indicating that a control resource, in a frame of a carrier, is associated with a first scheduling interval that spans a first duration in a time-domain and that a payload resource, in the frame of the carrier, is associated with a second scheduling interval that spans a second duration in the time-domain greater than the first duration and transmit, over the carrier, the control resource and the payload resource based on transmitting the system information. The communication manager 915 may be an example of aspects of the communication manager 1210 described herein.

The communication manager 915, or its sub-components, may be implemented in hardware, code (for example, software or firmware) executed by a processor, or any combination thereof. If implemented in code executed by a processor, the functions of the communication manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communication manager 915, or its sub-components, may be physically located at different locations, including being distributed such that portions of functions are implemented at different physical locations by one or more physical components. In some examples, the communication manager 915, or its sub-components, may be a separate and distinct component in accordance with various aspects of the present disclosure. In some examples, the communication manager 915, or its sub-components, may be combined with one or more other hardware components.

The transmitter 920 may transmit signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas.

Figure 10:
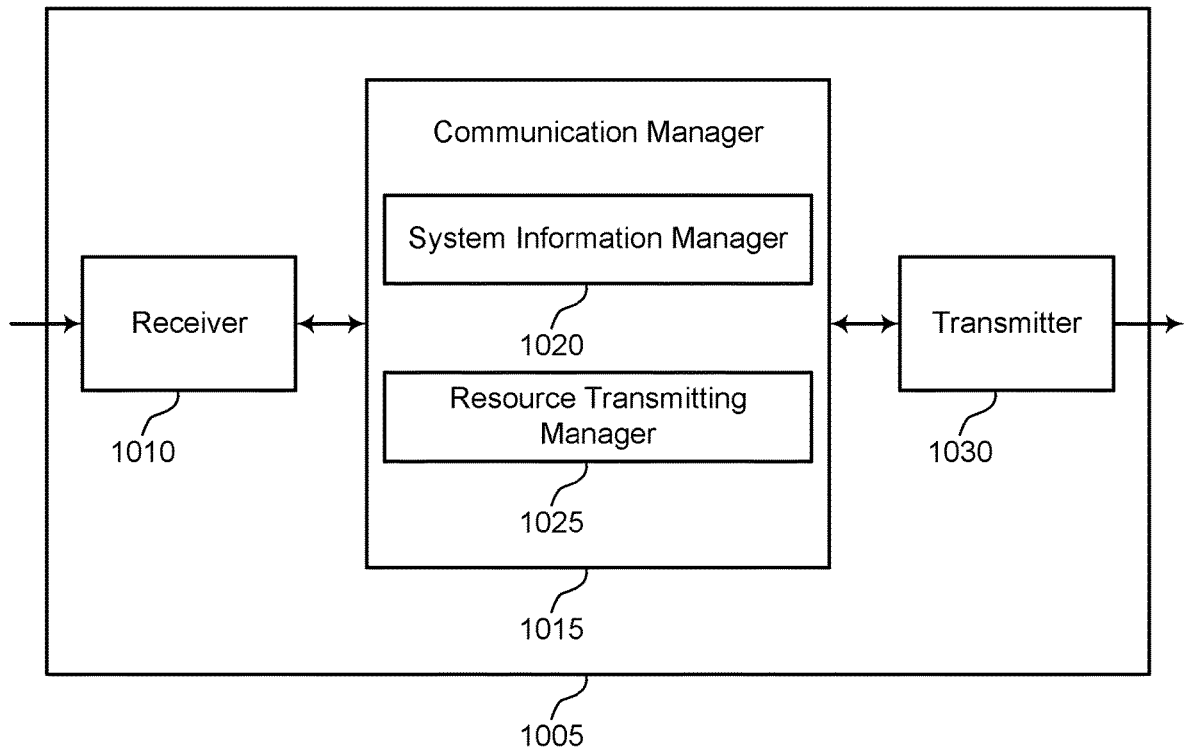

FIG. 10 shows a block diagram of a device 1005 that supports numerologies for broadcasting over a carrier in accordance with aspects of the present disclosure. The device 1005 may be an example of aspects of a device 905, a transmitter 105, or a base station as described herein. In some implementations, the functions of the device 1005 may be performed by one or more of a base station, or one or more network components associated with the base station. The device 1005 may include a receiver 1010, a communication manager 1015, and a transmitter 1030. The communication manager 1015 may be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to numerologies that support broadcasting over a carrier, among other examples). Information may be passed on to other components of the device 1005. The receiver 1010 may be an example of aspects of the transceiver 1220 described with reference to FIG. 12. The receiver 1010 may utilize a single antenna or a set of antennas.

The communication manager 1015 may be an example of aspects of the communication manager 915 as described herein. The communication manager 1015 may include a system information manager 1020 and a resource transmitting manager 1025. The communication manager 1015 may be an example of aspects of the communication manager 1210 described herein.

The system information manager 1020 may transmit system information indicating that a control resource, in a frame of a carrier, is associated with a first scheduling interval that spans a first duration in a time-domain and that a payload resource, in the frame of the carrier, is associated with a second scheduling interval that spans a second duration in the time-domain greater than the first duration.

The resource transmitting manager 1025 may transmit, over the carrier, the control resource and the payload resource based on transmitting the system information.

The transmitter 1030 may transmit signals generated by other components of the device 1005. In some examples, the transmitter 1030 may be collocated with a receiver 1010 in a transceiver component. For example, the transmitter 1030 may be an example of aspects of the transceiver 1220 described with reference to FIG. 12. The transmitter 1030 may utilize a single antenna or a set of antennas.

Figure 11:
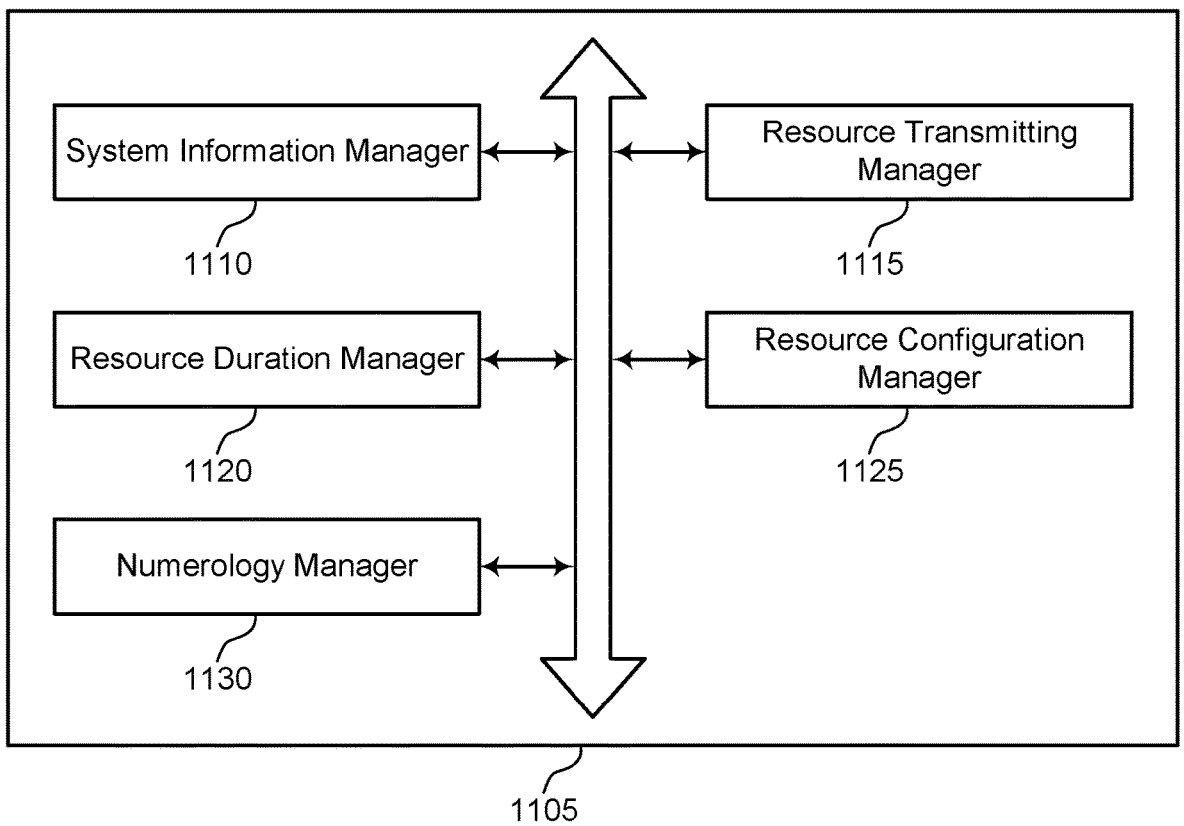
FIG. 11 shows a block diagram of a communication manager for numerologies that support broadcasting over a carrier in accordance with aspects of the present disclosure.

FIG. 11 shows a block diagram of a communication manager 1105 that supports numerologies for broadcasting over a carrier in accordance with aspects of the present disclosure. The communication manager 1105 may be an example of aspects of a communication manager 915, a communication manager 1015, or a communication manager 1210 described herein. The communication manager 1105 may include a system information manager 1110, a resource transmitting manager 1115, a resource duration manager 1120, a resource configuration manager 1125, and a numerology manager 1130. Each of these components may communicate, directly or indirectly, with one another (for example, via one or more buses).

The system information manager 1110 may transmit system information indicating that a control resource, in a frame of a carrier, is associated with a first scheduling interval that spans a first duration in a time-domain and that a payload resource, in the frame of the carrier, is associated with a second scheduling interval that spans a second duration in the time-domain greater than the first duration. In some examples, the system information manager 1110 may transmit a SIB that includes the system information. In some examples, the system information may include one or more of a numerology of the frame or a quantity of payload resources in the frame. In some examples, the system information includes SystemInformationBlockType1-MBMS. In some examples, the SystemInformationBlockType1-MBMS includes an information element that indicates the second duration of the second scheduling interval.

The resource transmitting manager 1115 may transmit, over the carrier, the control resource and the payload resource based on transmitting the system information. In some examples, the resource transmitting manager 1115 may configure a transmitter based on determining that the first scheduling interval spans the first duration and the second scheduling interval spans the second duration. In some examples, transmitting the system information is based on configuring the transmitter. In some examples, the carrier may include an MBMS carrier. In some examples, the MBMS carrier may be an MBMS-dedicated carrier.

The resource duration manager 1120 may identify that the first scheduling interval spans the first duration in the time-domain and that the second scheduling interval spans the second duration in the time-domain longer than the first duration. In some examples, transmitting the system information is based on identifying the first duration and the second duration. In some examples, the resource duration manager 1120 may determine an inter-site distance associated with a transmitter of the carrier. In some examples, determining the first duration and the second duration is based on the inter-site distance associated with the transmitter.

In some examples, the resource duration manager 1120 may determine that a first payload resource spans the second duration in the time-domain and a second payload resource spans a third duration in the time-domain different than the second duration and greater than the first duration. In some examples, transmitting the system information is based on determining that the first payload resource spans the second duration and the second payload resource spans the third duration. In some examples, the resource duration manager 1120 may determine that each payload resource of a first set of payload resources spans the second duration. In some examples, the resource duration manager 1120 may determine that each payload resource of a second set of payload resources spans a third duration in the time-domain different than the second duration. In some examples, transmitting the system information is based on the determining the second duration and the third duration.

In some examples, the resource duration manager 1120 may determine that a first portion of the single symbol spans a third duration in the time-domain and a second portion of the single symbol spans a fourth duration in the time-domain that is greater than the third duration. In some examples, transmitting the system information is based on determining the third duration and the fourth duration. In some examples, a duration of the second scheduling interval may be configurable based on the system information.

In some examples, the third duration may be a first integer multiple of a sampling interval associated with the carrier. In some examples, the fourth duration may be a second integer multiple of the sampling interval greater than the first integer multiple. In some examples, the third duration may be greater than 200 microseconds. In some examples, the fourth duration may be greater than 800 microseconds. In some examples, the second duration of the second scheduling interval may be an integer multiple of a sampling interval associated with the carrier. In some examples, the first duration associated with the first scheduling interval may be one millisecond. In some examples, the second duration associated with the second scheduling interval may be greater than one millisecond. In some examples, a duration of the frame in the time-domain may be forty milliseconds.

The resource configuration manager 1125 may determine a quantity of payload resources in the frame. In some examples, transmitting the system information is based on determining the quantity of payload resources in the frame. In some examples, the resource configuration manager 1125 may determine a first quantity of payload resources of a first type based on the system information. In some examples, the payload resources of the first type include the payload resource. In some examples, the resource configuration manager 1125 may determine a second quantity of payload resources of a second type based on the system information. In some examples, transmitting the system information is based on determining the first quantity and the second quantity.

In some examples, the resource configuration manager 1125 may determine that the second scheduling interval includes a single symbol that spans the second duration. In some examples, transmitting the system information is based on determining that the second scheduling interval includes the single symbol. In some examples, the second set of payload resources may include a single payload resource. In some examples, the first set of payload resources may include a set of payload resources and the second set of payload resources may include a set of payload resources. In some examples, the first portion of the single symbol may include a cyclic prefix of the single symbol. In some examples, the second portion of the single symbol may include a payload of the single symbol. In some examples, the second scheduling interval may include a MBSFN subframe. In some examples, the first scheduling interval may include a non-MBSFN subframe. In some examples, the first scheduling interval may include a CAS.

The numerology manager 1130 may determine a first numerology associated with the control resource and a second numerology associated with the payload resource different than the first numerology. In some examples, transmitting the system information is based on determining the first numerology and the second numerology.

Figure 12:
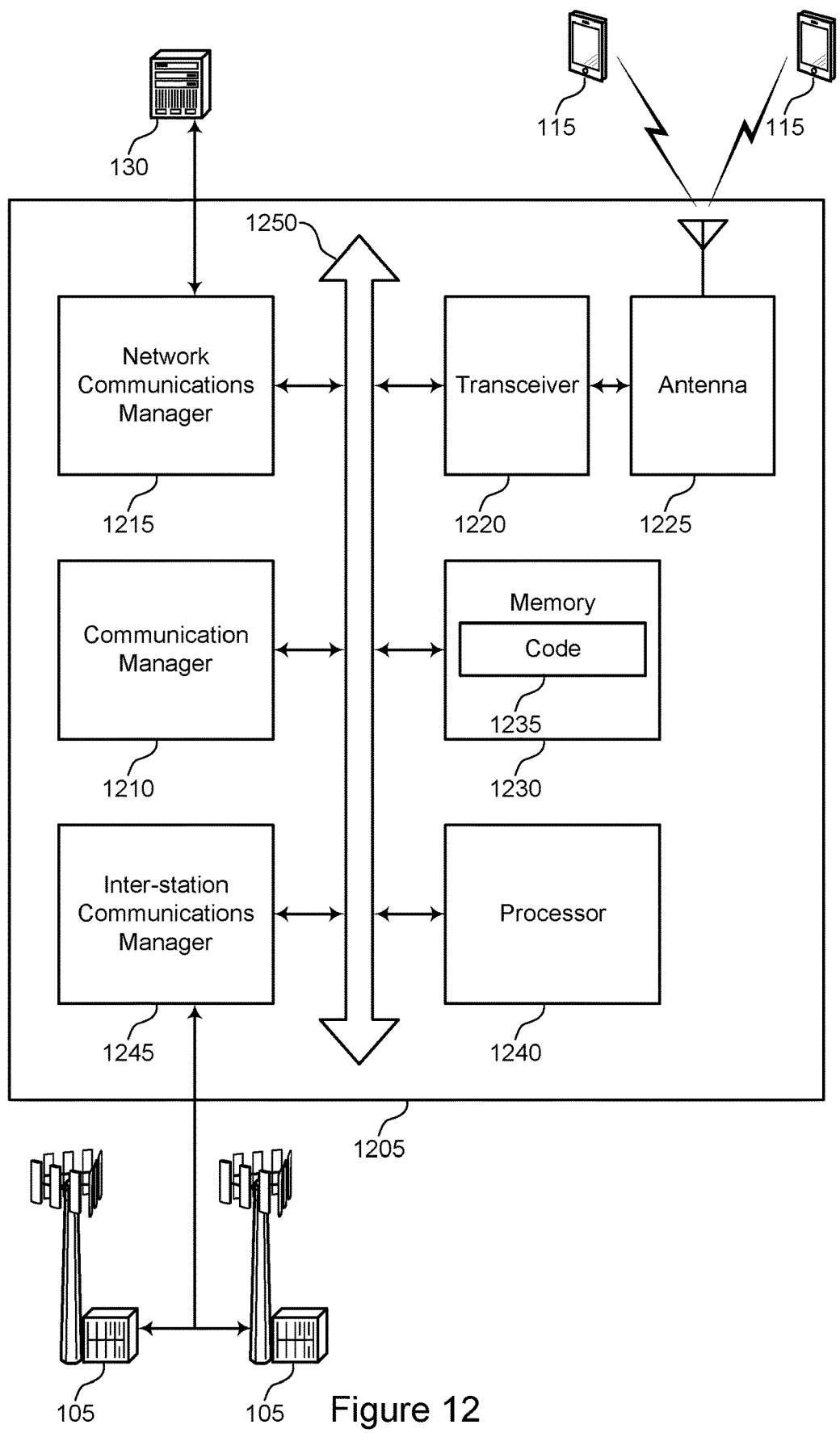
FIG. 12 shows a diagram of a system including a device for numerologies that support broadcasting over a carrier in accordance with aspects of the present disclosure.

FIG. 12 shows a diagram of a system including a device 1205 that supports numerologies for broadcasting over a carrier in accordance with aspects of the present disclosure. The device 1205 may be an example of or include the components of device 905, device 1005, a transmitter 105, or a base station as described herein. In some implementations, the functions of the device 1205 may be performed by one or more of a base station, or one or more network components associated with the base station. The device 1205 may include components for bi-directional voice and data communications including components for transmitting and receiving communications, including a communication manager 1210, a network communications manager 1215, a transceiver 1220, an antenna 1225, memory 1230, a processor 1240, and an inter-station communications manager 1245. These components may be in electronic communication via one or more buses (for example, bus 1250).

The communication manager 1210 may transmit system information indicating that a control resource, in a frame of a carrier, is associated with a first scheduling interval that spans a first duration in a time-domain and that a payload resource, in the frame of the carrier, is associated with a second scheduling interval that spans a second duration in the time-domain greater than the first duration and transmit, over the carrier, the control resource and the payload resource based on transmitting the system information.

The network communications manager 1215 may manage communications with the core network (for example, via one or more wired backhaul links). For example, the network communications manager 1215 may manage the transfer of data communications for client devices, such as one or more receivers 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some examples, the wireless device may include a single antenna 1225. However, in some examples the device may have more than one antenna 1225, which may be capable of concurrently transmitting or receiving multiple wireless transmissions.

The memory 1230 may include one or more of RAM or ROM. The memory 1230 may store computer-readable code 1235 including instructions that, when executed by a processor (for example, the processor 1240) cause the device to perform various functions described herein. In some examples, the memory 1230 may contain, among other things, a BIOS which may control basic hardware or software operation such as the interaction with peripheral components or devices.

The processor 1240 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1240 may be configured to operate a memory array using a memory controller. In some examples, a memory controller may be integrated into processor 1240. The processor 1240 may be configured to execute computer-readable instructions stored in a memory (for example, the memory 1230) to cause the device 1205 to perform various functions (for example, functions or tasks supporting numerologies that support broadcasting over a carrier).

The inter-station communications manager 1245 may manage communications with other transmitter 105, and may include a controller or scheduler for controlling communications with receivers 115 in cooperation with other transmitters 105. For example, the inter-station communications manager 1245 may coordinate scheduling for transmissions to receivers 115 for various interference mitigation techniques such as beamforming or joint transmission. In some examples, the inter-station communications manager 1245 may provide an X2 interface within an LTE/LTE-A wireless communication network technology to provide communication between transmitters 105.

The code 1235 may include instructions to implement aspects of the present disclosure, including instructions to support wireless communications. The code 1235 may be stored in a non-transitory computer-readable medium such as system memory or other type of memory. In some examples, the code 1235 may not be directly executable by the processor 1240 but may cause a computer (for example, when compiled and executed) to perform functions described herein.

Figure 13:
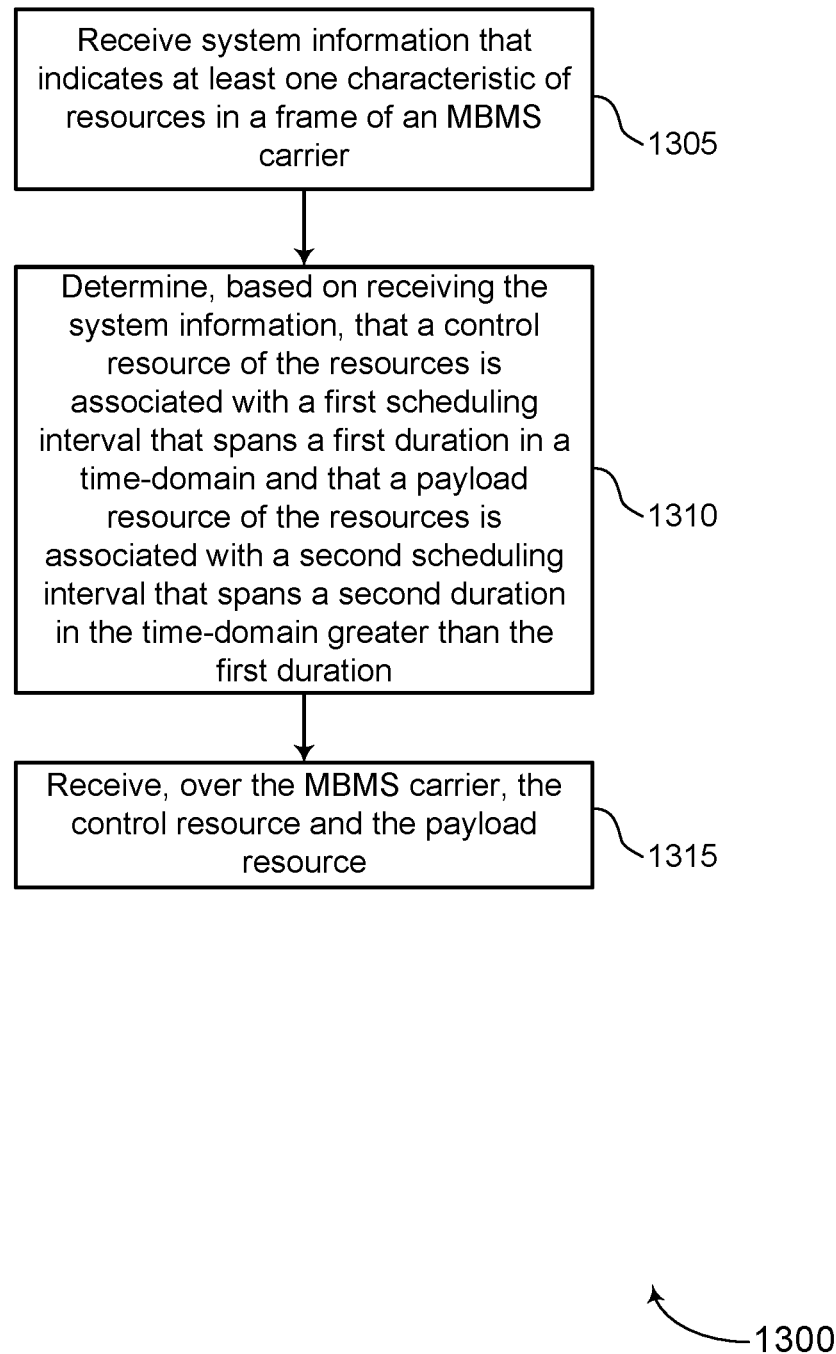
FIGS. 13 through 19 show flowcharts illustrating methods for numerologies that support broadcasting over a carrier in accordance with aspects of the present disclosure.

FIG. 13 shows a flowchart illustrating a method 1300 that supports numerologies for broadcasting over a carrier in accordance with aspects of the present disclosure. The operations of method 1300 may be implemented by a receiver 115 or a UE or its components as described herein. For example, the operations of method 1300 may be performed by a communication manager as described with reference to FIGS. 5-8. In some examples, a receiver may execute a set of instructions to control the functional elements of the receiver to perform the functions described herein. Additionally or alternatively, a receiver may perform aspects of the functions described herein using special-purpose hardware.

At 1305, the receiver may receive system information that indicates at least one characteristic of resources in a frame of an MBMS carrier. The operations of 1305 may be performed according to the methods described herein. In some examples, aspects of the operations of 1305 may be performed by a system information manager as described with reference to FIGS. 5-8.

At 1310, the receiver may determine, based on receiving the system information, that a control resource of the resources is associated with a first scheduling interval that spans a first duration in a time-domain and that a payload resource of the resources is associated with a second scheduling interval that spans a second duration in the time-domain greater than the first duration. The operations of 1310 may be performed according to the methods described herein. In some examples, aspects of the operations of 1310 may be performed by a resource duration manager as described with reference to FIGS. 5-8.

At 1315, the receiver may receive, over the MBMS carrier, the control resource and the payload resource. The operations of 1315 may be performed according to the methods described herein. In some examples, aspects of the operations of 1315 may be performed by a resource receiving manager as described with reference to FIGS. 5-8.

Figure 14:
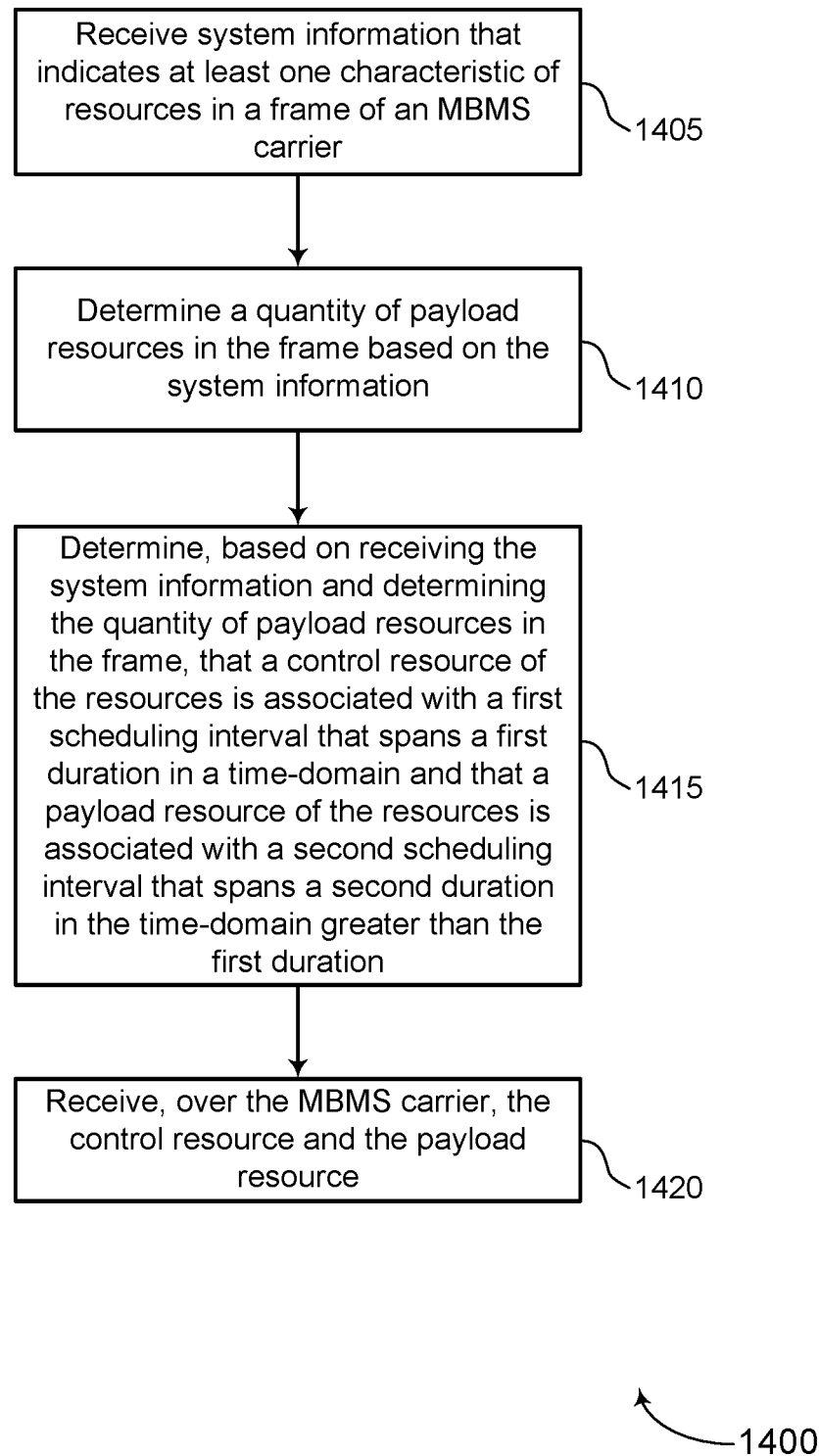

FIG. 14 shows a flowchart illustrating a method 1400 that supports numerologies for broadcasting over a carrier in accordance with aspects of the present disclosure. The operations of method 1400 may be implemented by a receiver 115 or a UE or its components as described herein. For example, the operations of method 1400 may be performed by a communication manager as described with reference to FIGS. 5-8. In some examples, a receiver may execute a set of instructions to control the functional elements of the receiver to perform the functions described herein. Additionally or alternatively, a receiver may perform aspects of the functions described herein using special-purpose hardware.

At 1405, the receiver may receive system information that indicates at least one characteristic of resources in a frame of an MBMS carrier. The operations of 1405 may be performed according to the methods described herein. In some examples, aspects of the operations of 1405 may be performed by a system information manager as described with reference to FIGS. 5-8.

At 1410, the receiver may determine a quantity of payload resources in the frame based on the system information. The operations of 1410 may be performed according to the methods described herein. In some examples, aspects of the operations of 1410 may be performed by a resource configuration manager as described with reference to FIGS. 5-8.

At 1415, the receiver may determine, based on receiving the system information and determining the quantity of payload resources in the frame, that a control resource of the resources is associated with a first scheduling interval that spans a first duration in a time-domain and that a payload resource of the resources is associated with a second scheduling interval that spans a second duration in the time-domain greater than the first duration. The operations of 1415 may be performed according to the methods described herein. In some examples, aspects of the operations of 1415 may be performed by a resource duration manager as described with reference to FIGS. 5-8.

At 1420, the receiver may receive, over the MBMS carrier, the control resource and the payload resource. The operations of 1420 may be performed according to the methods described herein. In some examples, aspects of the operations of 1420 may be performed by a resource receiving manager as described with reference to FIGS. 5-8.

Figure 15:
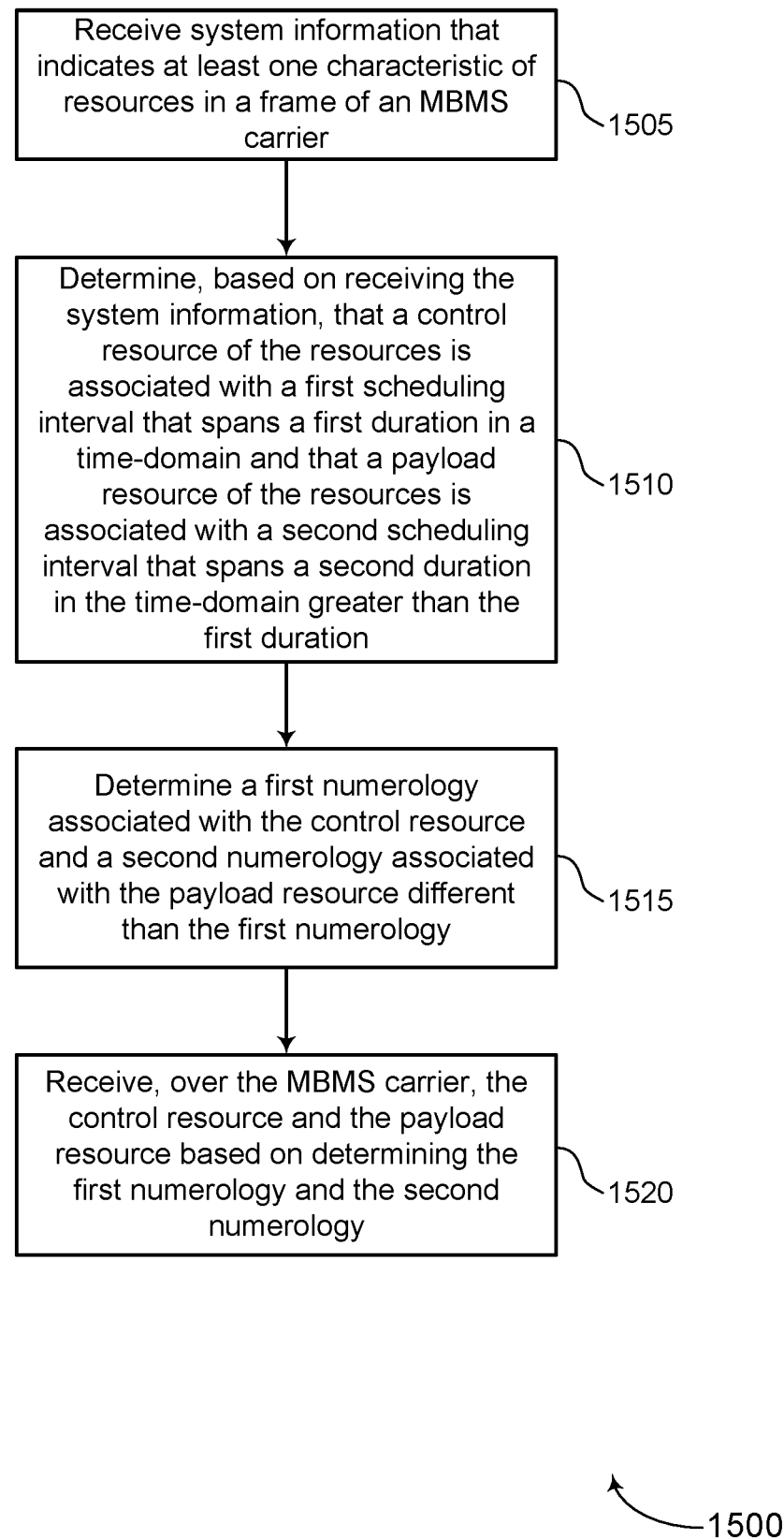

FIG. 15 shows a flowchart illustrating a method 1500 that supports numerologies for broadcasting over a carrier in accordance with aspects of the present disclosure. The operations of method 1500 may be implemented by a receiver 115 or a UE or its components as described herein. For example, the operations of method 1500 may be performed by a communication manager as described with reference to FIGS. 5-8. In some examples, a receiver may execute a set of instructions to control the functional elements of the receiver to perform the functions described herein. Additionally or alternatively, a receiver may perform aspects of the functions described herein using special-purpose hardware.

At 1505, the receiver may receive system information that indicates at least one characteristic of resources in a frame of an MBMS carrier. The operations of 1505 may be performed according to the methods described herein. In some examples, aspects of the operations of 1505 may be performed by a system information manager as described with reference to FIGS. 5-8.

At 1510, the receiver may determine, based on receiving the system information, that a control resource of the resources is associated with a first scheduling interval that spans a first duration in a time-domain and that a payload resource of the resources is associated with a second scheduling interval that spans a second duration in the time-domain greater than the first duration. The operations of 1510 may be performed according to the methods described herein. In some examples, aspects of the operations of 1510 may be performed by a resource duration manager as described with reference to FIGS. 5-8.

At 1515, the receiver may determine a first numerology associated with the control resource and a second numerology associated with the payload resource different than the first numerology. The operations of 1515 may be performed according to the methods described herein. In some examples, aspects of the operations of 1515 may be performed by a numerology manager as described with reference to FIGS. 5-8.

At 1520, the receiver may receive, over the MBMS carrier, the control resource and the payload resource based on determining the first numerology and the second numerology. The operations of 1520 may be performed according to the methods described herein. In some examples, aspects of the operations of 1520 may be performed by a resource receiving manager as described with reference to FIGS. 5-8.

Figure 16:
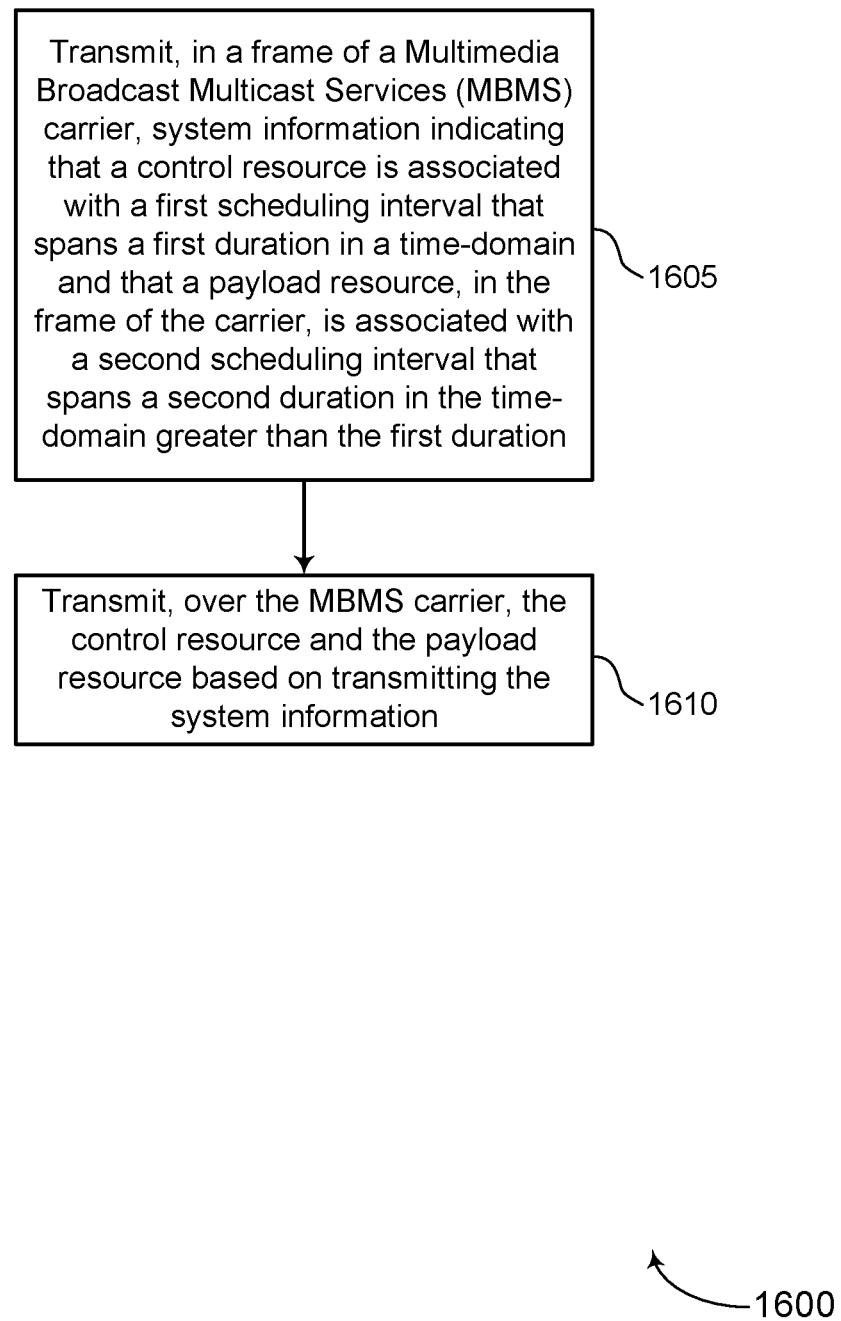

FIG. 16 shows a flowchart illustrating a method 1600 that supports numerologies for broadcasting over a carrier in accordance with aspects of the present disclosure. The operations of method 1600 may be implemented by a transmitter 105 or a base station or its components as described herein. For example, the operations of method 1600 may be performed by a communication manager as described with reference to FIGS. 9-12. In some examples, a transmitter may execute a set of instructions to control the functional elements of the transmitter to perform the functions described herein. Additionally or alternatively, a transmitter may perform aspects of the functions described herein using special-purpose hardware.

At 1605, the transmitter may transmit, in a frame of a MBMS carrier, system information indicating that a control resource is associated with a first scheduling interval that spans a first duration in a time-domain and that a payload resource, in the frame of the carrier, is associated with a second scheduling interval that spans a second duration in the time-domain greater than the first duration. The operations of 1605 may be performed according to the methods described herein. In some examples, aspects of the operations of 1605 may be performed by a system information manager as described with reference to FIGS. 9-12.

At 1610, the transmitter may transmit, over the MBMS carrier, the control resource and the payload resource based on transmitting the system information. The operations of 1610 may be performed according to the methods described herein. In some examples, aspects of the operations of 1610 may be performed by a resource transmitting manager as described with reference to FIGS. 9-12.

Figure 17:
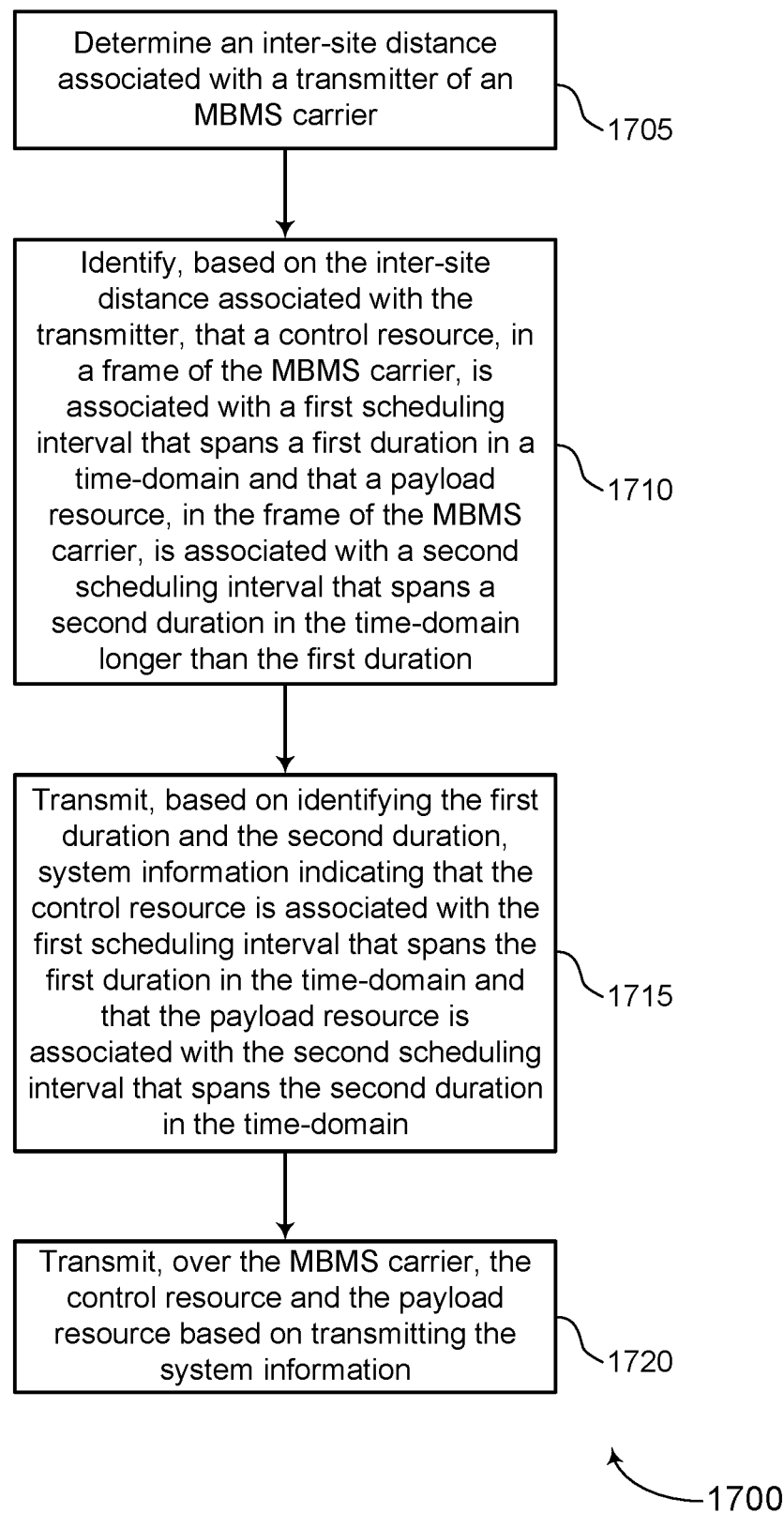

FIG. 17 shows a flowchart illustrating a method 1700 that supports numerologies for broadcasting over a carrier in accordance with aspects of the present disclosure. The operations of method 1700 may be implemented by a transmitter 105 or a base station or its components as described herein. For example, the operations of method 1700 may be performed by a communication manager as described with reference to FIGS. 9-12. In some examples, a transmitter may execute a set of instructions to control the functional elements of the transmitter to perform the functions described herein. Additionally or alternatively, a transmitter may perform aspects of the functions described herein using special-purpose hardware.

At 1705, the transmitter may determine an inter-site distance associated with a transmitter of an MBMS carrier. The operations of 1705 may be performed according to the methods described herein. In some examples, aspects of the operations of 1705 may be performed by a resource duration manager as described with reference to FIGS. 9-12.

At 1710, the transmitter may identify, based on the inter-site distance associated with the transmitter, that a control resource, in a frame of the MBMS carrier, is associated with a first scheduling interval that spans a first duration in a time-domain and that a payload resource, in the frame of the MBMS carrier, is associated with a second scheduling interval that spans a second duration in the time-domain longer than the first duration. The operations of 1710 may be performed according to the methods described herein. In some examples, aspects of the operations of 1710 may be performed by a resource duration manager as described with reference to FIGS. 9-12.

At 1715, the transmitter may transmit, based on identifying the first duration and the second duration, system information indicating that the control resource is associated with the first scheduling interval that spans the first duration in the time-domain and that the payload resource is associated with the second scheduling interval that spans the second duration in the time-domain. The operations of 1715 may be performed according to the methods described herein. In some examples, aspects of the operations of 1715 may be performed by a system information manager as described with reference to FIGS. 9-12.

At 1720, the transmitter may transmit, over the MBMS carrier, the control resource and the payload resource based on transmitting the system information. The operations of 1720 may be performed according to the methods described herein. In some examples, aspects of the operations of 1720 may be performed by a resource transmitting manager as described with reference to FIGS. 9-12.

Figure 18:
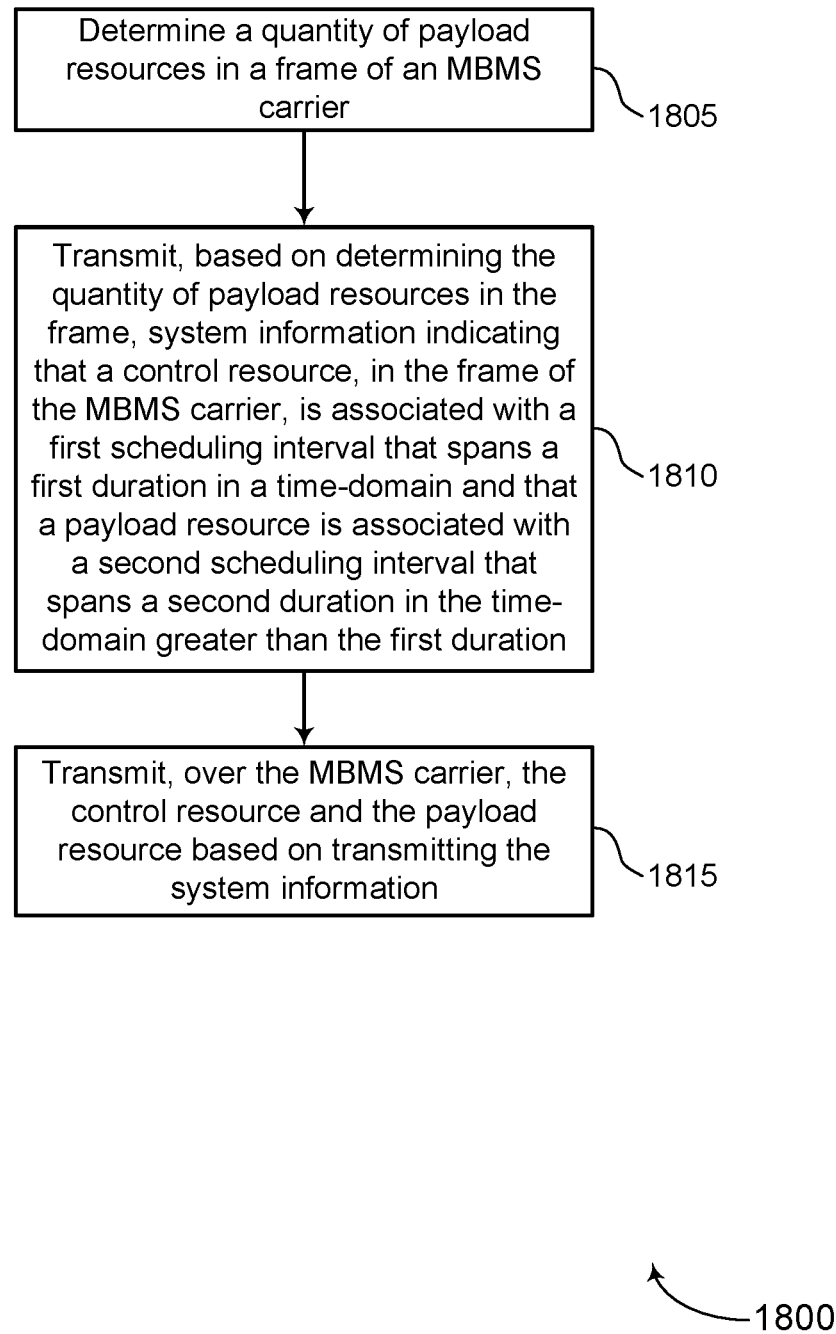

FIG. 18 shows a flowchart illustrating a method 1800 that supports numerologies for broadcasting over a carrier in accordance with aspects of the present disclosure. The operations of method 1800 may be implemented by a transmitter 105 or a base station or its components as described herein. For example, the operations of method 1800 may be performed by a communication manager as described with reference to FIGS. 9-12. In some examples, a transmitter may execute a set of instructions to control the functional elements of the transmitter to perform the functions described herein. Additionally or alternatively, a transmitter may perform aspects of the functions described herein using special-purpose hardware.

At 1805, the transmitter may determine a quantity of payload resources in a frame of an MBMS carrier. The operations of 1805 may be performed according to the methods described herein. In some examples, aspects of the operations of 1805 may be performed by a resource configuration manager as described with reference to FIGS. 9-12.

At 1810, the transmitter may transmit, based on determining the quantity of payload resources in the frame, system information indicating that a control resource, in the frame of the MBMS carrier, is associated with a first scheduling interval that spans a first duration in a time-domain and that a payload resource is associated with a second scheduling interval that spans a second duration in the time-domain greater than the first duration. The operations of 1810 may be performed according to the methods described herein. In some examples, aspects of the operations of 1810 may be performed by a system information manager as described with reference to FIGS. 9-12.

At 1815, the transmitter may transmit, over the MBMS carrier, the control resource and the payload resource based on transmitting the system information. The operations of 1815 may be performed according to the methods described herein. In some examples, aspects of the operations of 1815 may be performed by a resource transmitting manager as described with reference to FIGS. 9-12.

Figure 19:
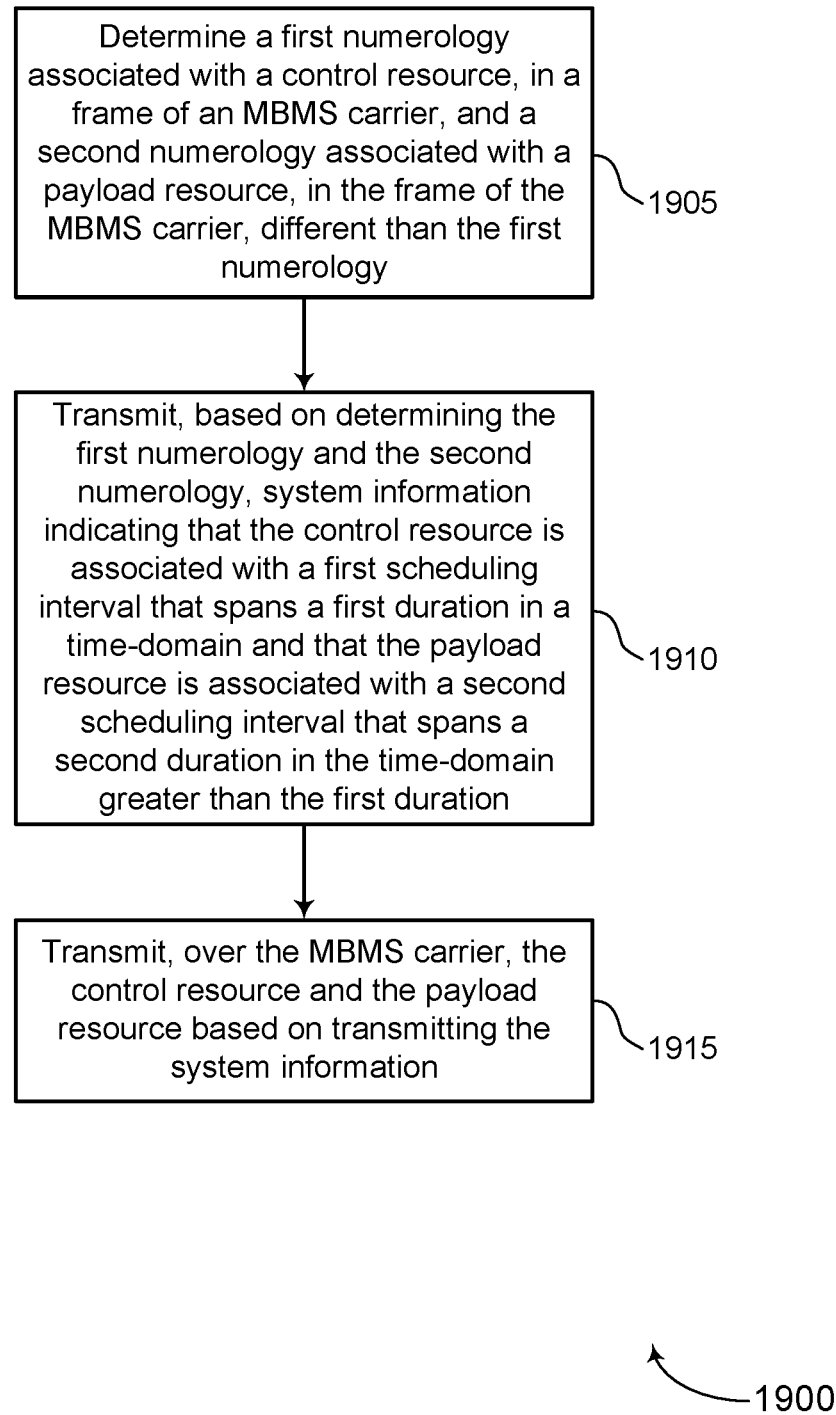

FIG. 19 shows a flowchart illustrating a method 1900 that supports numerologies for broadcasting over a carrier in accordance with aspects of the present disclosure. The operations of method 1900 may be implemented by a transmitter 105 or a base station or its components as described herein. For example, the operations of method 1900 may be performed by a communication manager as described with reference to FIGS. 9-12. In some examples, a transmitter may execute a set of instructions to control the functional elements of the transmitter to perform the functions described herein. Additionally or alternatively, a transmitter may perform aspects of the functions described herein using special-purpose hardware.

At 1905, the transmitter may determine a first numerology associated with a control resource, in a frame of an MBMS carrier, and a second numerology associated with a payload resource, in the frame of the MBMS carrier, different than the first numerology. The operations of 1905 may be performed according to the methods described herein. In some examples, aspects of the operations of 1905 may be performed by a numerology manager as described with reference to FIGS. 9-12.

At 1910, the transmitter may transmit, based on determining the first numerology and the second numerology, system information indicating that the control resource is associated with a first scheduling interval that spans a first duration in a time-domain and that the payload resource is associated with a second scheduling interval that spans a second duration in the time-domain greater than the first duration. The operations of 1910 may be performed according to the methods described herein. In some examples, aspects of the operations of 1910 may be performed by a system information manager as described with reference to FIGS. 9-12.

At 1915, the transmitter may transmit, over the MBMS carrier, the control resource and the payload resource based on transmitting the system information. The operations of 1915 may be performed according to the methods described herein. In some examples, aspects of the operations of 1915 may be performed by a resource transmitting manager as described with reference to FIGS. 9-12.

The methods described herein describe possible implementations, and that the operations may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000 or Universal Terrestrial Radio Access (UTRA), among other examples. CDMA2000 covers IS-2000, IS-95, and IS-856 standards. IS-2000 Releases may be commonly referred to as CDMA2000 1× or 1x, among other examples. IS-856 (TIA-856) is commonly referred to as CDMA2000 1×EV-DO or High Rate Packet Data (HRPD), among other examples. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, or Flash-OFDM, among other examples. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (for example, several kilometers in radius) and may allow unrestricted access by receivers with service subscriptions with the network provider. A small cell may be associated with a lower-powered base station, as compared with a macro cell, and a small cell may operate in the same or different (for example, licensed or unlicensed, among other examples) frequency bands as macro cells. Small cells may include pico cells, femto cells, and micro cells according to various examples. A pico cell, for example, may cover a small geographic area and may allow unrestricted access by receivers with service subscriptions with the network provider. A femto cell may also cover a small geographic area (for example, a home) and may provide restricted access by receivers having an association with the femto cell (for example, receivers in a closed subscriber group (CSG), receivers for users in the home, and the like). An eNB for a macro cell may be referred to as a macro eNB. An eNB for a small cell may be referred to as a small cell eNB, a pico eNB, a femto eNB, or a home eNB. An eNB may support one or multiple (for example, two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc. In some examples, disks usually reproduce data magnetically and discs usually reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving system information that indicates at least one characteristic of resources in a frame of a Multimedia Broadcast Multicast Services (MBMS) carrier; and
   receiving, over the MBMS carrier, based at least in part on receiving the system information, the frame, the frame comprising a control subframe, associated with a first scheduling interval that spans a first duration in a time domain, and a set of payload slots, at least one payload slot of the set of payload slots being associated with a second scheduling interval that spans a second duration in the time domain greater than the first duration.

2. The method of claim 1, further comprising determining a quantity of payload slots in the frame based at least in part on the system information, wherein determining that the second scheduling interval spans the second duration is based at least in part on determining the quantity of payload slots in the frame.

3. The method of claim 1, further comprising determining, based at least in part on the system information, that the second scheduling interval includes a single symbol that spans the second duration, wherein receiving the control subframe and the set of payload slots is based at least in part on determining that the second scheduling interval includes the single symbol.

4. The method of claim 3, further comprising determining that a first portion of the single symbol spans a third duration in the time-domain and a second portion of the single symbol spans a fourth duration in the time-domain that is greater than the third duration, wherein receiving the control subframe and the set of payload slots is based at least in part on determining the third duration and the fourth duration.

5. The method of claim 4, wherein:
the first portion of the single symbol comprises a cyclic prefix of the single symbol; and
the second portion of the single symbol comprises a payload of the single symbol.

6. The method of claim 4, wherein:
the third duration is a first integer multiple of a sampling interval associated with the MBMS carrier; and
the fourth duration is a second integer multiple of the sampling interval greater than the first integer multiple.

7. The method of claim 4, wherein:
the third duration is greater than 200 microseconds; and
the fourth duration is greater than 800 microseconds.

8. The method of claim 1, further comprising determining a first numerology associated with the control subframe and a second numerology associated with the set of payload slots different than the first numerology, wherein receiving the control subframe and the set of payload slots is based at least in part on determining the first numerology and the second numerology.

9. The method of claim 1, wherein receiving the system information further comprises receiving a system information block (SIB) that includes the system information.

10. The method of claim 1, wherein the system information comprises SystemInformationBlockType1-MBMS.

11. The method of claim 10, wherein:
the SystemInformationBlockType1-MBMS comprises an information element that indicates the second duration of the second scheduling interval; and
the MBMS carrier is an MBMS-dedicated carrier.

12. The method of claim 1, wherein:
the second scheduling interval comprises a Multicast-broadcast Single-frequency Network (MBSFN) subframe; and
the first scheduling interval comprises a non-MBSFN subframe.

13. The method of claim 1, wherein the first scheduling interval comprises a cell acquisition subframe (CAS).

14. The method of claim 1, wherein a duration of the second scheduling interval is configurable based at least in part on the system information.

15. The method of claim 1, wherein the second duration of the second scheduling interval is associated with a subcarrier spacing of the MBMS carrier.

16. The method of claim 1, wherein:
the first duration associated with the first scheduling interval is one millisecond; and
the second duration associated with the second scheduling interval is greater than one millisecond.

17. The method of claim 16, wherein:
the second duration associated with the second scheduling interval is three milliseconds; and
the frame comprises thirteen payload slots.

18. The method of claim 16, wherein a duration of the frame in the time-domain is forty milliseconds.

19. The method of claim 1, wherein the control subframe comprises one or two slots of a third duration in the time-domain smaller than the second duration.

20. A method for wireless communication, comprising:
transmitting system information that indicates at least one characteristic of resources in a frame of a Multimedia Broadcast Multicast Services (MBMS) carrier; and
transmitting, over the MBMS carrier, based at least in part on transmitting the system information, the frame, the frame comprising a control subframe, associated with a first scheduling interval that spans a first duration in a time domain, and a set of payload slots, at least one payload slot of the set of payload slots being associated with a second scheduling interval that spans a second duration in the time domain greater than the first duration.

21. The method of claim 20, further comprising identifying that the first scheduling interval spans the first duration in the time-domain and that the second scheduling interval spans the second duration in the time-domain greater than the first duration, wherein transmitting the system information is based at least in part on identifying the first duration and the second duration.

22. The method of claim 21, further comprising determining an inter-site distance associated with a transmitter of the MBMS carrier, wherein determining the first duration and the second duration is based at least in part on the inter-site distance associated with the transmitter.

23. The method of claim 20, further comprising determining a quantity of payload slots in the frame, wherein transmitting the system information is based at least in part on determining the quantity of payload slots in the frame.

24. The method of claim 20, further comprising determining that the second scheduling interval includes a single symbol that spans the second duration, wherein transmitting the system information is based at least in part on determining that the second scheduling interval includes the single symbol.

25. The method of claim 20, further comprising determining a first numerology associated with the control subframe and a second numerology associated with the set of payload slots different than the first numerology, wherein transmitting the system information is based at least in part on determining the first numerology and the second numerology.

26. The method of claim 20, wherein the system information comprises SystemInformationBlockType1-MBMS.

27. The method of claim 20, wherein:
the first duration associated with the first scheduling interval is one millisecond; and
the second duration associated with the second scheduling interval is greater than one millisecond.

28. The method of claim 20, wherein:
the second duration associated with the second scheduling interval is three milliseconds; and
the frame comprises thirteen payload slots.

29. An apparatus for wireless communication, comprising: a processor, memory in electronic communication with the processor; and instructions stored in the memory and executable by the processor to cause the apparatus to:

receive system information that indicates at least one characteristic of resources in a frame of a Multimedia Broadcast Multicast Services (MBMS) carrier; and receive, over the MBMS carrier, based at least in part on receiving the system information, the frame, the frame comprising a control subframe, associated with a first scheduling interval that spans a first duration in a time domain, and a set of payload slots, at least one payload slot of the set of payload slots being associated with a second scheduling interval that spans a second duration in the time domain greater than the first duration.

30. An apparatus for wireless communication, comprising: a processor, memory in electronic communication with the processor; and instructions stored in the memory and executable by the processor to cause the apparatus to:

transmit system information that indicates at least one characteristic of resources in a frame of a Multimedia Broadcast Multicast Services (MBMS) carrier; and transmit, over the MBMS carrier, based at least in part on transmitting the system information, the frame, the frame comprising a control subframe, associated with a first scheduling interval that spans a first duration in a time domain, and a set of payload slots, at least one payload slot of the set of payload slots being associated with a second scheduling interval that spans a second duration in the time domain greater than the first duration.

* * * * *